(12) United States Patent
Jackson

(10) Patent No.: US 8,141,292 B1
(45) Date of Patent: Mar. 27, 2012

(54) PLANT ERADICATION USING UNNATURAL MECHANICAL AND THERMAL TRAUMA

(75) Inventor: Jonathan A Jackson, Dayton, OH (US)

(73) Assignee: Global Neighbor, Inc., Dayton, OH (US)

( * ) Notice: Subject to any disclaimer, the term of this patent is extended or adjusted under 35 U.S.C. 154(b) by 0 days.

(21) Appl. No.: 12/818,145

(22) Filed: Jun. 17, 2010

Related U.S. Application Data

(62) Division of application No. 11/897,297, filed on Aug. 29, 2007, now Pat. No. 7,954,276.

(51) Int. Cl.
*A01M 15/00* (2006.01)
*A01B 41/00* (2006.01)

(52) U.S. Cl. .......................................... 47/1.44; 47/1.43
(58) Field of Classification Search ................... 47/1.44, 47/1.43, 1.3
See application file for complete search history.

(56) References Cited

U.S. PATENT DOCUMENTS

| | | | | |
|---|---|---|---|---|
| 1,843,187 A | * | 2/1932 | Wood | 47/1.3 |
| 1,982,646 A | * | 12/1934 | Dick | 47/1.3 |
| 1,991,930 A | * | 2/1935 | Hope | 111/7.1 |
| 2,051,684 A | * | 8/1936 | Dick | 47/1.3 |

* cited by examiner

*Primary Examiner* — Kristen C Hayes
(74) *Attorney, Agent, or Firm* — Elting Patents and Technology LLC; Mark J. Elting

(57) ABSTRACT

Plant eradication using by inflicting upon a plant root (R) unnatural hot wound mechanical and thermal trauma delivered from a hot stab knife (V) which produces a stab gash (K) sufficiently deep to traverse plant cortex (C) and penetrate to plant xylem (X), simultaneous with or followed by heating the damaged area to a temperature of higher than 70 C, preferably 200 C for a sufficient time to cause cellular damage to the plant root. The root and hot stab knife may be shrouded to increase the temperature adjacent the stab gash. Preferably, the stab knife is formed to be sufficiently acuate and flat so as to allow a surface/volume ratio for the stab knife to be at least twice that of a cone of similar size and extent. Unhealable damage results, believed to caused by role conversion of organisms in the rhizosphere from sybiosis to antagonism.

12 Claims, 17 Drawing Sheets

— Prior Art —

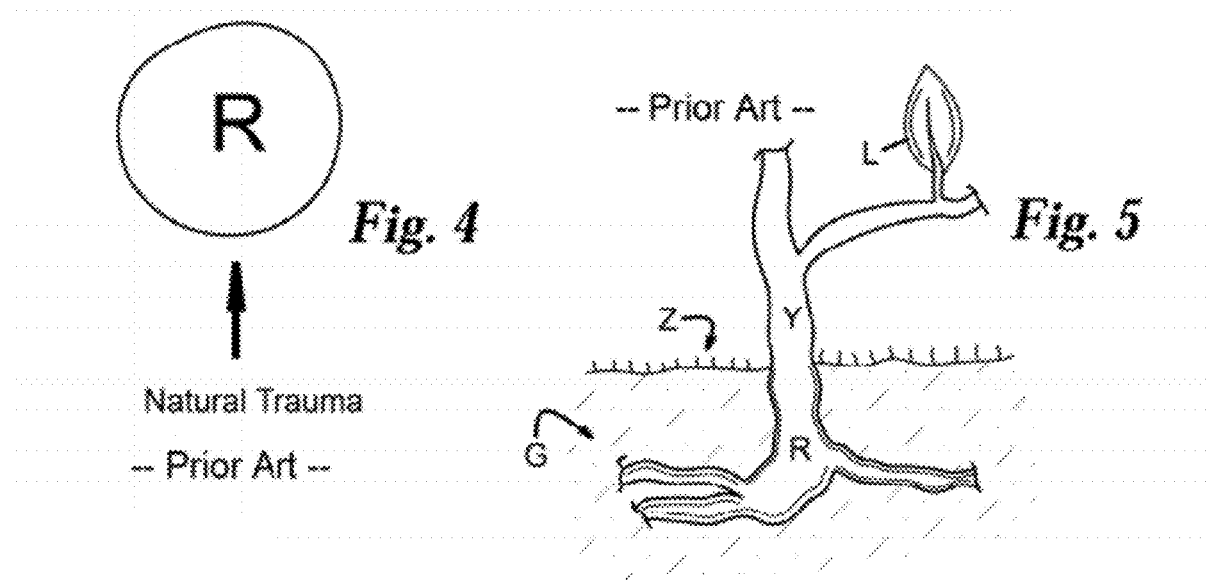
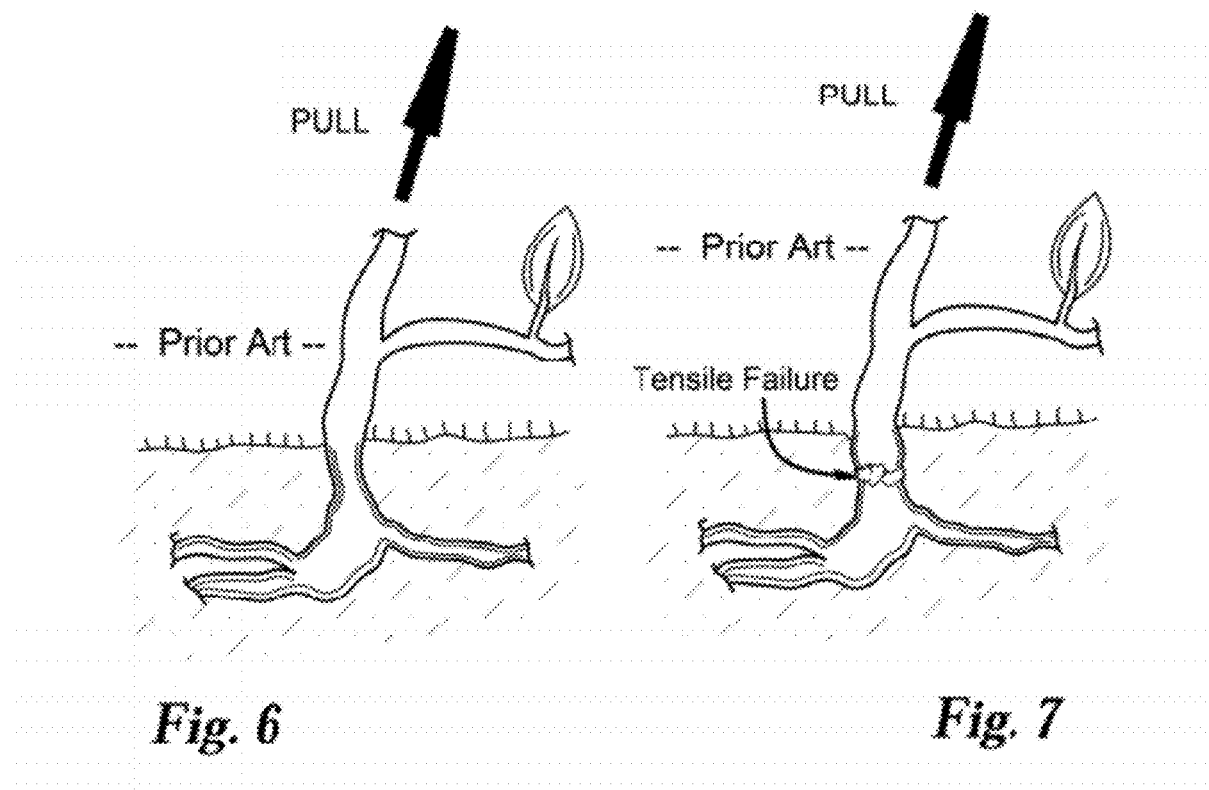

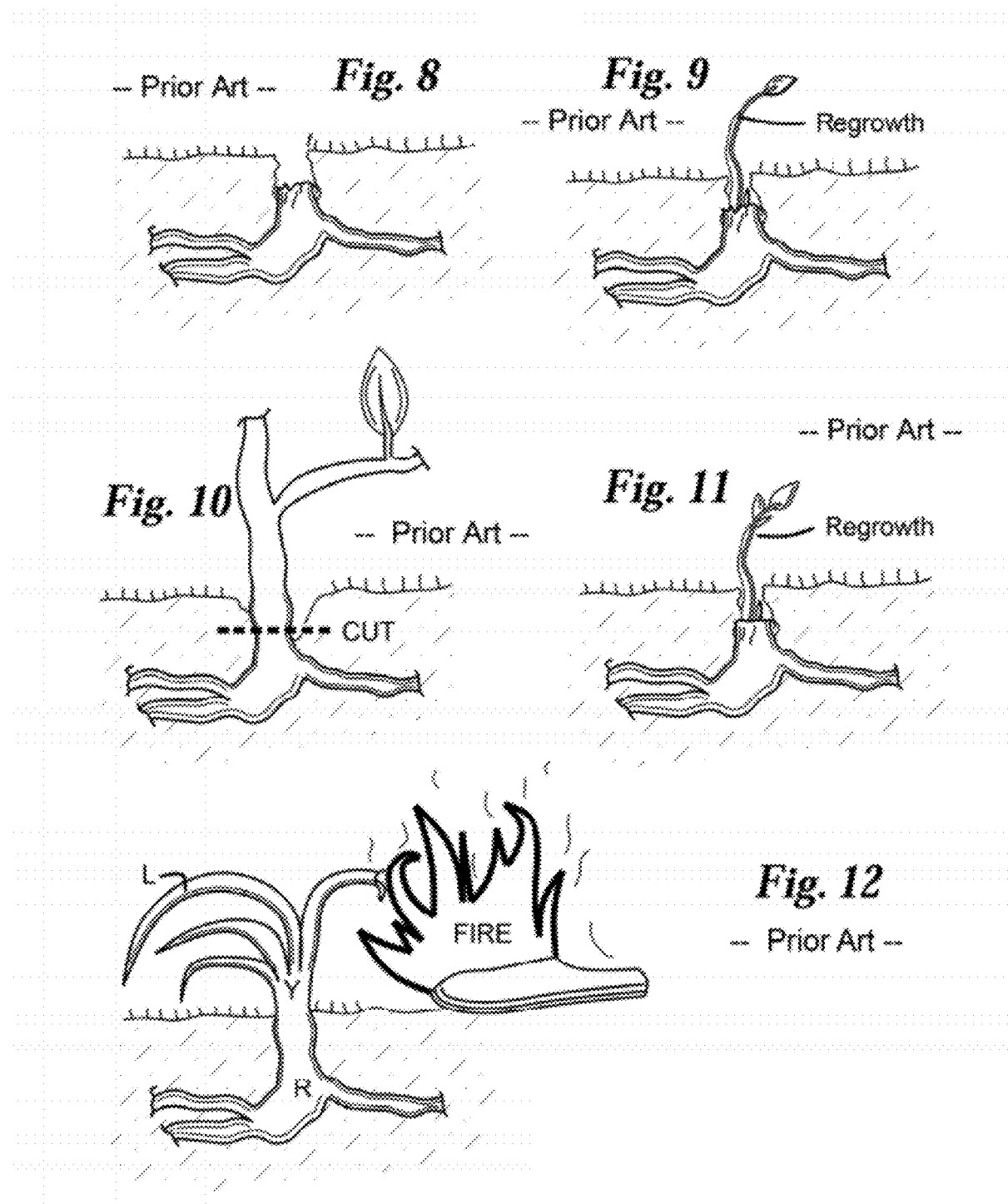

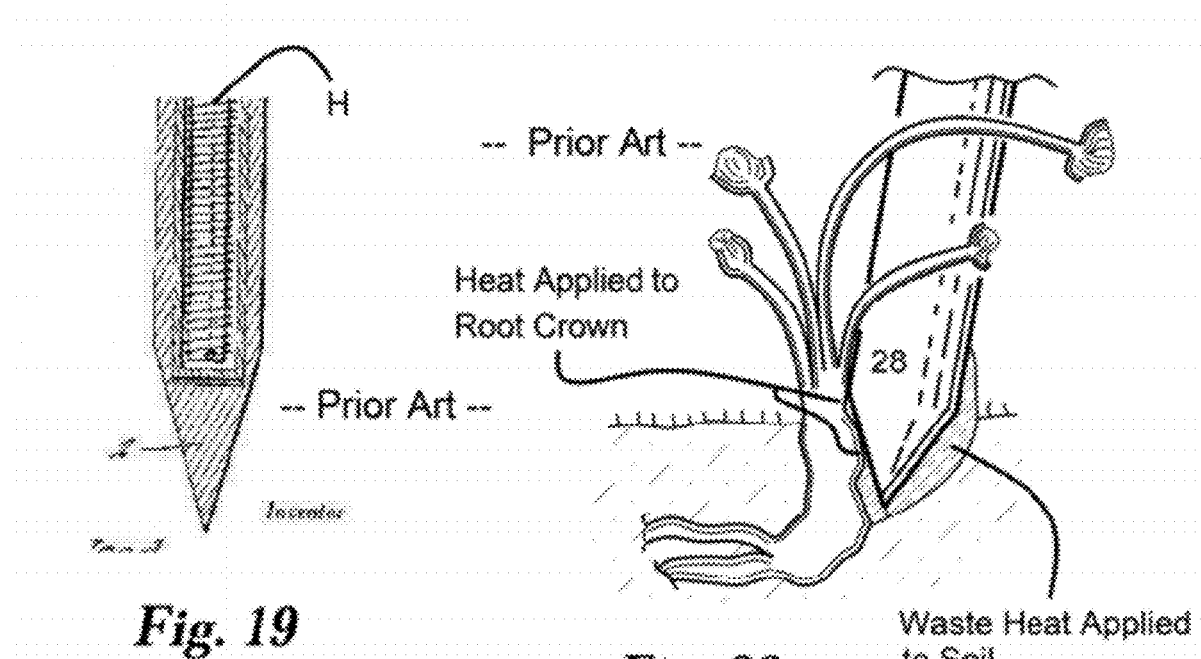
Fig. 19
Fig. 20
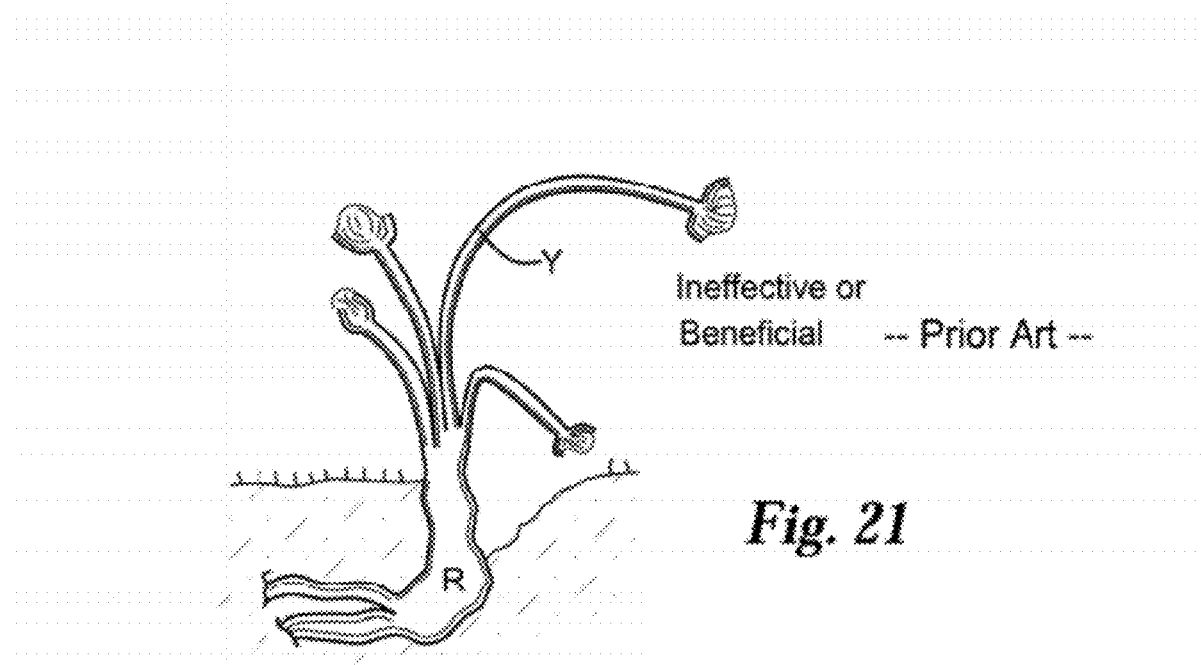
Fig. 21

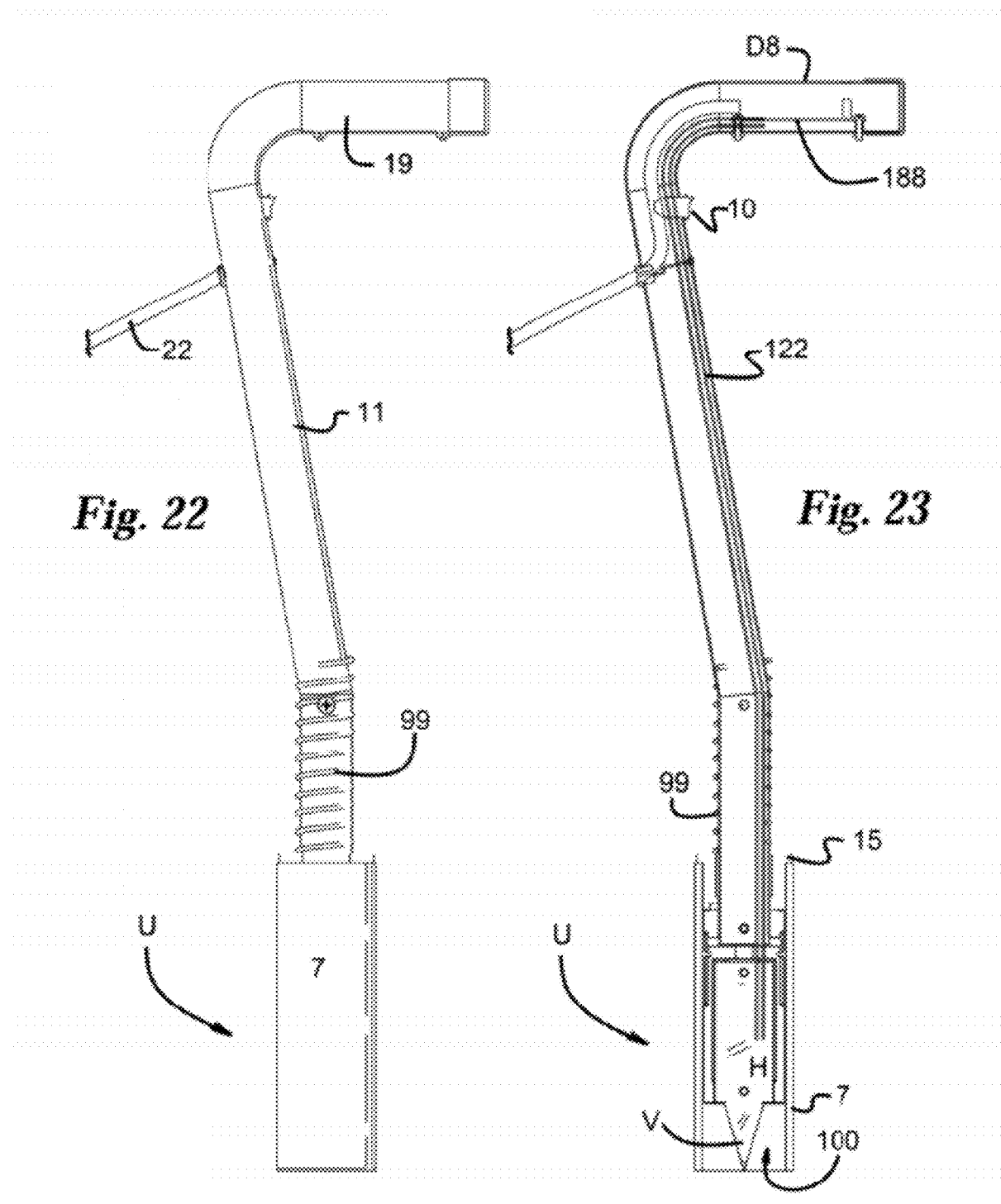

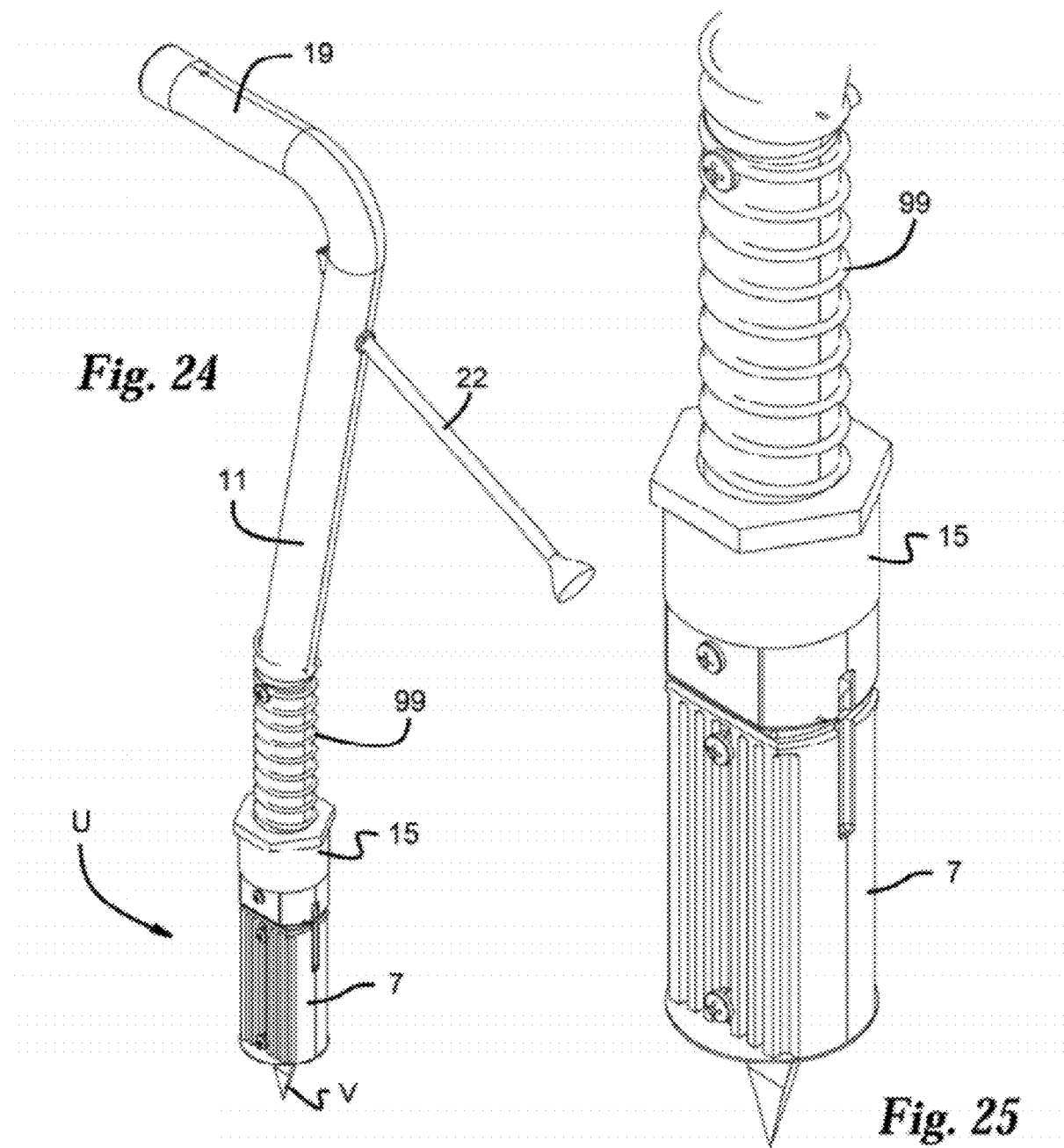

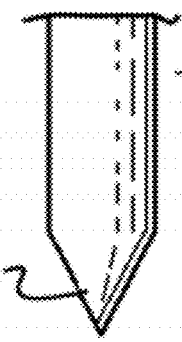
Fig. 28 — Prior Art —
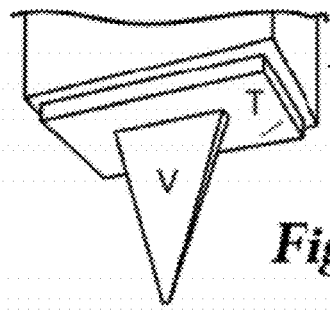
Fig. 29
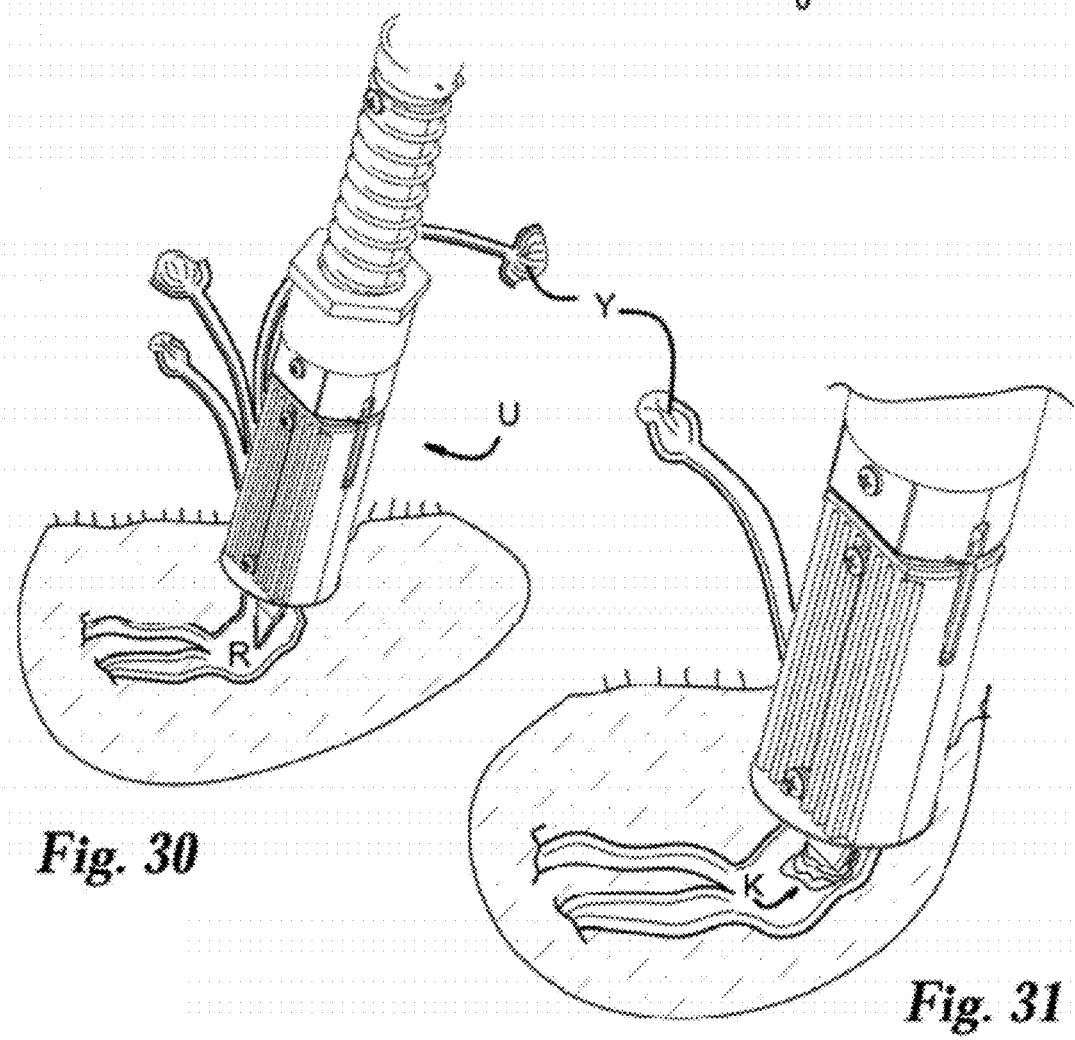
Fig. 30
Fig. 31

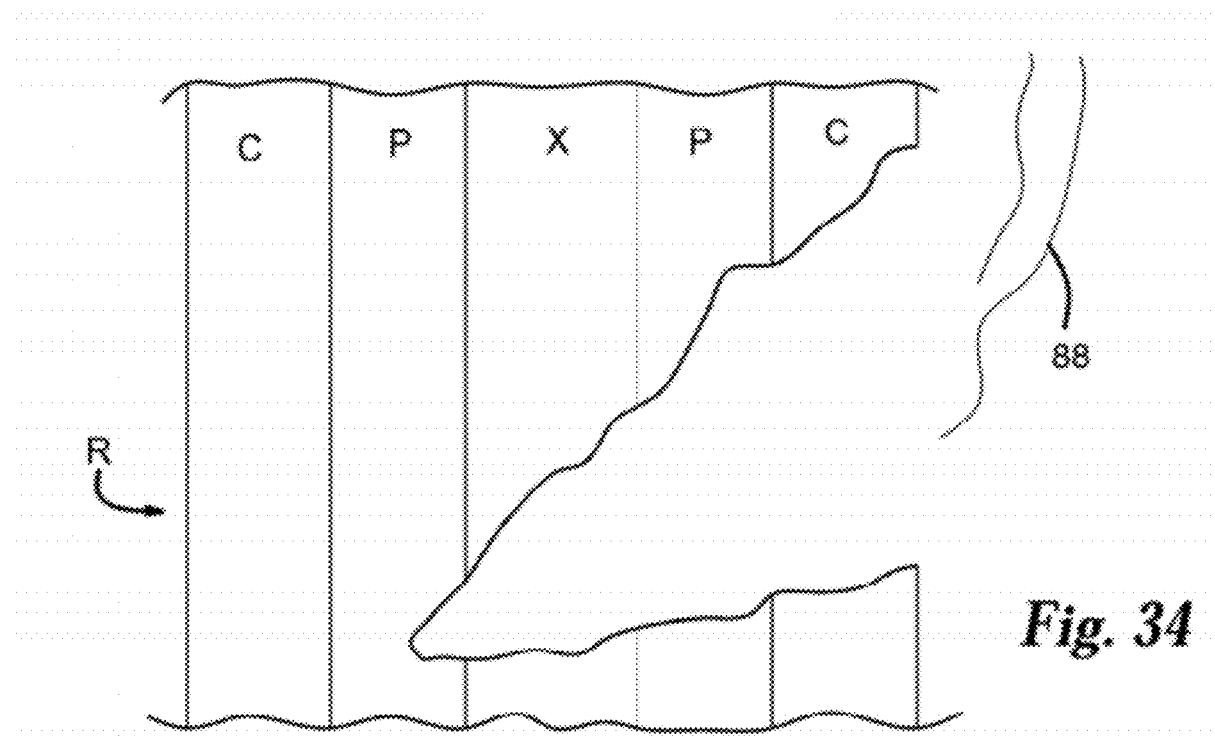
Fig. 34
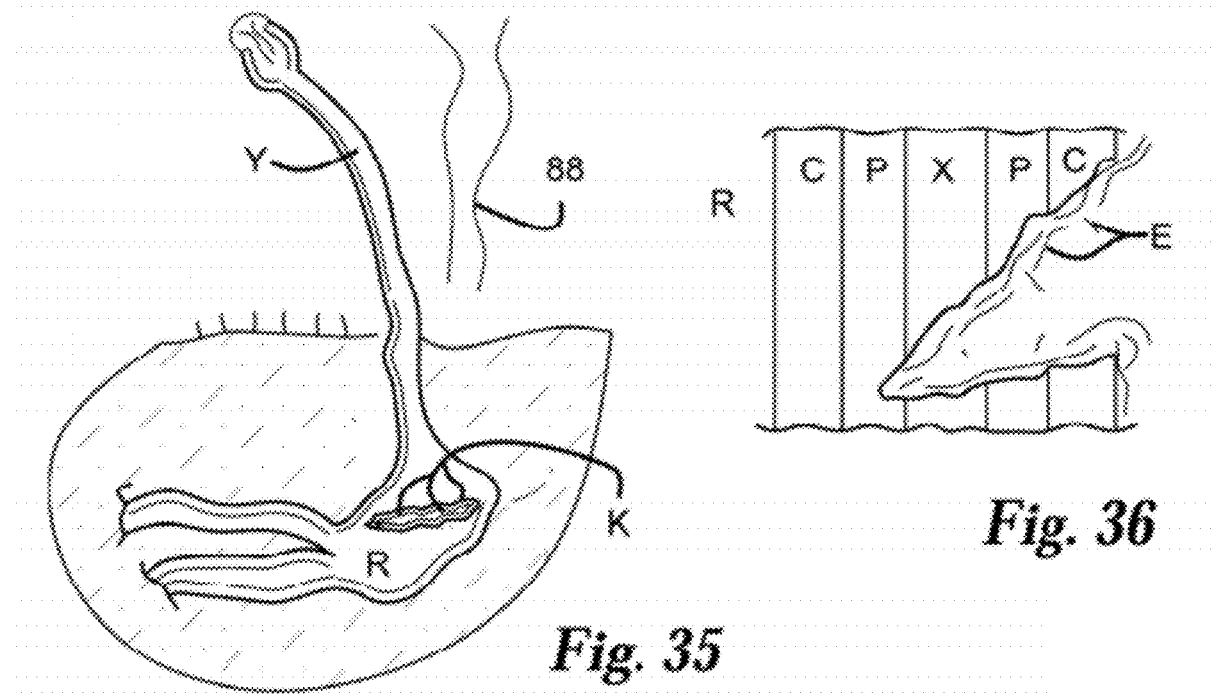
Fig. 35
Fig. 36

-- Prior Art --

PLANT ERADICATION USING UNNATURAL MECHANICAL AND THERMAL TRAUMA

TECHNICAL FIELD

This is a divisional application directed solely to subject matter described and claimed in parent U.S. patent application Ser. No. 11/897,297 as originally filed 29 Aug. 2007 now U.S. Pat. No. 7,954,276. The entire disclosure of this prior original (parent) application is hereby incorporated herein by reference in its entirety. This invention relates to plant and weed control using mechanical and thermal trauma. More specifically, it relates to the use of unnatural thermal and mechanical trauma to induce plant death, by triggering an interruption of healthy symbiosis of a plant root with rhizosphere microorganisms surrounding the root.

BACKGROUND OF THE INVENTION

In lawn care, groundskeeping and landscape care, there is a great need for plant or weed control without the application of herbicides or toxic substances.

Reducing the use of pesticides for weed and plant control has become an issue of national importance. Ground water is vitally important and the use of herbicides to prevent weeds from growing in homeowner and commercial lawns adversely impacts the quality of ground water. Most herbicides are persistent, soluble in water, and ingestion at high toxicity levels can be carcinogenic, affecting the human nervous system and causing endocrine disruption.

To protect water quality, simple removal methods not relying on pesticides are widely sought. Ninety-five percent of fresh water on earth is ground water. Ground water is found in natural rock formations called aquifers, and are a vital natural resource with many uses. Over 50% of the USA population relies on ground water as a source of drinking water, especially in rural areas.

In the USA, concerns about the potential impacts of herbicides on human health, as well as on terrestrial and aquatic ecosystems, have led to a wide range of monitoring and management programs by state and federal agencies, such as the U.S. Environmental Protection Agency (USEPA). For example, atrazine is a toxic, white, crystalline solid organic compound widely used as an herbicide for control of broadleaf and grassy weeds, and has been detected in concentrations problematic for human and animal health.

Mechanical and thermal phenomena marshaled against undesirable plants by prior art devices, methods and teachings are not effective, and this is due to the natural robustness of plants, due to their physiology and responses to natural trauma. The role of repair, regrowth, and the beneficial effects of soil-borne microbes all play a role in the hardiness of plants to prior art thermal and mechanical methods for plant control.

Referring to FIG. 1, a schematic representation of a typical plant root is shown in cross section. In root R illustratively shown, a central xylem layer X is shown surrounded by a phloem layer P. The xylem layer X (see definitions) operates to transport water and when needed, healing substances that repair wounds, such as burn wounds or severing, lacerations, and the like. Phloem layer P is typically a living transport layer which transports organic substances such as glucose and other sugars, amino acids and hormones. Surrounding phloem layer P is cortex C, which is in turn surrounded by an epidermis E1 as shown.

Root R is typically surrounded by earth or soil G. FIG. 2 shows a schematic of a plant root cross section surrounded by rhizospheric soil in the immediate vicinity of the root, or on or the root itself.

It is well known that soil-borne microbes interact with plant roots and soil constituents at the root-soil interface. This produces a dynamic environment of root-microbe interactions known as the rhizosphere, whose character and effect on the life of a plant varies widely with differing physical, chemical, and biological properties of the root-associated soil. Root-free soil without such organisms is known as bulk soil. Releasing of root exudates, such as epidermis flakes and other secretions, is sometimes called rhizodeposition and provides growth material, structural material or signals for root-associated microbiota. These microbiota feed on proteins and sugars released by roots. Protozoa and nematodes that feed on bacteria are also present in the rhizosphere, and provide nutrient cycling and disease suppression by warding off pathogens. Reference: Oxford Journals Journal of Experimental Botany Volume 56, Number 417 Pp. 1761-1778, hereby incorporated in this disclosure in its entirety.

The balance of populations in a healthy symbiotic rhizosphere is important, because, in part, the bacteria which provide disease suppression interact with pathogens in a variety of ways, including mechanisms of antagonism, such as by competition for nutrients, parasitism, predation and antibiosis. Fungi, too, can be involved, and their actions, when turned from symbiotic to antagonistic, can be lethal for a plant.

There are three separate, but interacting, components recognized in the rhizosphere: the rhizospheric soil, the rhizoplane, and the root itself. The rhizosphere is soil influenced by roots via release of substances that affect microbial activity. The rhizoplane is the root surface, including the strongly adhering soil particles. The root itself also participates, because certain micro-organisms, known as endophytes, are able to colonize root tissues.

Now referring to FIG. 3, a schematic representation is shown of a plant root acted upon by heat, cutting and damage (shown), which is the subject of this invention. But as shown in FIG. 4, much of the possible actions using heating, cutting and damage are tolerated by a plant as being natural trauma for which there are repair and regrowth processes.

FIG. 5 shows partial cross sectional, partial surface view of a plant in soil, with a root structure in soil, and is given merely to be illustrative. Plant Y is shown with root R established in earth or soil G under a ground plane Z. Plant Y possesses the root features as given in FIG. 1, and other components such as leaf or leaves L as shown.

FIGS. 6-21 show prior art eradication processes or natural trauma which are not effective for plant control, using views similar to that of FIG. 5. For example, in FIGS. 6-9 showing pulling to induce tensile failure such as by natural events like feeding of cows and other ruminants. FIG. 7 shows a tensile failure (shown) in root R occurring below the ground surface Z. FIG. 8 shows the root R after the body of plant Y as previously shown has been removed, leaving a stumped root as shown. FIG. 9 shows Regrowth from root R, which is a common response to such a natural trauma.

FIGS. 10-11 show a similar response to a severing action or cut, with FIG. 10 showing schematically a CUT using a dashed line, which can represent gnawing or eating by an animal, or cutting using a cutting tool or machine such as a chain saw. For example, the top 5 cm (2 inches) of root can be gnawed or cut away. The result, a response by a healthy plant is shown in FIG. 11, where Regrowth is again shown, where new shoots are induced by hormonal and other changes in the plant.

FIGS. 12-14 show the result of burn or fire treatment to the plant root and surrounding soil. Many methods for plant control in the prior art employ fire, steam, or other methods to burn or overheat plant structures. FIG. 12 shows schematically a FIRE impinging upon plant Y and/or root R, with FIG. 13 showing a burned root R with a burned stump as shown, such as might be found after a forest fire, with combusion byproducts, volatilized proteins or smoke 88 rising from the stump as shown. Even obliterating plant Y above ground in this manner typically results in the response shown in FIG. 14, which shows Regrowth similar to that shown in FIGS. 9 and 11.

FIGS. 15-16 show a response to similar healable trauma in the form of surface trauma delivered to plant root epidermis and cortex. FIG. 15 shows lacerating or abrasion of the epidermis and possibly the cortex of root R, such as by a gnawing animal, or by trauma delivered by a shovel blade or other tool (shown, Surface Trauma to Cortex). Repair typically ensues, as shown in FIG. 16 where the root has been violated, using known repair processes studied in the botanical arts.

The rich and robust response mechanisms found in plants to deal with trauma can even deal with trauma that are not so obviously emulating natural events, such as the hot needle wound shown illustratively in FIGS. 17-18. FIG. 17 shows a Hot Needle Wound (shown) where a hot needle pierces root R, possibly right to xylem layer X. The problem with this type of trauma is it is well defined and lends itself to repair using latex or other healing substances that are dispatched to the scene of the wound, usually using xylem layer X to transport needed enzymes and healing tars. The result is shown in FIG. 18 as a Repair to the root structure, restoring function for plant survival.

Because of the ability to withstand forest fires and lightning strikes, most plants do not respond in large numbers to application of heat as given in the prior art. FIG. 19 shows a prior art heat applicator disclosed in U.S. Pat. No. 1,843,187 to Wood, employing a heater H in thermal communication with an application rod as shown. As will be discussed below, the shape of the rod is not appropriate for effecting the present invention, and Wood '187 does not teach or suggest the methods or devices taught here.

Application of thermal contactors or applicators such as shown in FIG. 19 have not met with success (see discussion below). Prior art eradicator 28 as shown in FIG. 20 is brought to bear upon plant Y and root R, allowing for Heat Applied to Root Crown (shown). Much of the heat in these types of devices is wasted through heat losses to air and soil (see discussion for FIG. 41), in part shown, Waste Heat Applied to Soil. The result, as given in FIG. 21 is ineffective or can be beneficial or stimulative, with repair to root R often making the root more robust to future similar trauma.

As can be seen from the above discussion, the delivery of trauma which resembles natural trauma (e.g., application of heat alone) is not effective, because the plants so treated tend to heal and regenerate, probably as a result of centuries of evolution.

For example, in U.S. Pat. No. 5,189,832 to Hoek et al., gas-fired burners are directed at nuisance vegetation along a ground plane. This and other prior art methods which burn or heat plant parts usually fail, because plants have evolved to tolerate, and sometimes be stimulated by, forest fires and lightning strikes.

Moreover, merely severing a plant, such as using a chain saw to cut vegetation also does not work. Cutting or severing root stock often allows new growth to emerge from the root. For example, in U.S. Pat. No. 5,305,584 to Hessabi, a flat spade-like heated element is used to sever vegetation. The active injuring element severs, but does not inflict a specific unnatural injury as taught here, and in particular, the heated rod of Hessabi '584 of FIG. 6 is not effective for long term weed control.

As discussed, cutting plant roots and warming roots are not particularly effective for weed or plant control in most cases. With plants having evolved for regrowth despite severing roots, or forest-fire related fire and heat damage, prior art mechanical and thermal methods have low success rates.

This is true despite assertions made in prior art patent publications. For example, U.S. Pat. No. 1,399,529 to J. R. Stewart states that with his invention the application of the intense heat is directed upon the crown of the weed root and it is immediately killed. (See Col 1, lines 23-26). However, this method has been shown to be ineffective, with maximum success rates obtained on the order of 25 percent. Moreover, the teaching of Stewart '529 does not address any particular wound to a plant root. A device is given which employs a tip that terminates in a sharpened point 13. In using the device this point is thrust into the ground so that the crown of the weed root is in contact with the metal surface of the point (see Col 2 lines 71-75). Using such a device having a conical tip (such as shown in FIG. 19), it is not easy to stab a root manually, as the tip tends to side-swipe or miss stabbing engagement with a plant root.

Speed of application and overall success rate are very important, and other prior art devices fall short in satisfying these two considerations. For example, U.S. Pat. No. 2,051, 684 and also U.S. Pat. No. 1,982,646 to Dick do not teach or suggest any root stab, only teaching simple application of heat to a plant root. Similarly, U.S. Pat. No. 1,843,187 to Wood does not suggest a stab capability or heat or temperature details that would allow a special trauma that is unhealable in most cases. Although Wood '187 teaches use of a needle, it appears that this form is used for the purpose of driving the needle into the ground (see Wood '187 claim 2), so as to be proximate a plant root for contact heating purposes only.

Thermal considerations play a role and the prior art is largely silent on the role of temperature and wound shapes. Generally, the prior art gives no teaching as to how to inflict damage that is unhealable to a plant.

SUMMARY OF THE INVENTION

Accordingly, one of the objects of the invention is to provide thermal and mechanical means for plant control with a success rate significantly higher than obtained using prior art methods. Although it is hard to generalize because results vary by plant, plant condition, sunlight, climate, soil conditions, including composition and pH, it is believed that the unexpected success of the invention results from a disruption of normal collective behavior of rhizosphere microorganisms. This invention teaches infliction of a specific unnatural injury, a hot stab gash wound with a dwell sufficient to cause particular cellular damage which has been found unexpectedly to yield a higher than expected probability of being unhealable. The injury causes roots to self rot, after fungi, initially stimulated by leached sugars, are left to consume the plant root. While prior art success rates of 25-50 percent prevail, use of the present invention results in success rates obtained in excess of 80 or 90 percent, where success is defined as plant death as a result of using the invention.

The invention teaches a method for eradicating a plant using unnatural hot wound mechanical and thermal trauma delivered from a stab knife to a root of the plant. The method comprises:

[1] Producing a stab gash (K) using a stab knife (V) so formed as to be at least one of acuate and v-shaped, and additionally sufficiently acuate and flat with a surface-to-volume ratio for the stab knife to be at least twice that of a cone of similar size and extent, the stab gash sufficiently deep to traverse a cortex (C) of the plant root and penetrate to a xylem (X) of the root at a location;

[2] heating the root using a heater (H) in thermal communication with the stab knife and via dwell of the stab knife in the root at the location, with the stab knife held at a temperature of higher than 70 C for sufficient time to cause a cellular damage to the plant root, including the xylem at the location.

Alternately, the root can be heated independently from contact with the stab knife, using, for example, steam.

The invention also gives a method to trigger an interruption of a healthy symbiosis of a plant root with rhizosphere microorganisms surrounding the root, the method comprising:

[1] Performing a similar invasive gash wound on the root, with the invasive gash wound traversing a cortex of the root and penetrating to a xylem layer of the root;

[2] Heating a vicinity of the gash wound to a temperature of at least 70 C for sufficient time to cause sufficient cellular damage to the root to produce later a wound exudate from the invasive gash wound.

The invention also provides for a hot stab plant eradicator for eradicating a plant using unnatural hot wound mechanical and thermal trauma delivered from a stab unit to a root of the plant, the hot stab plant eradicator comprising:

[1] a stab knife held in the stab unit and so formed as to be sufficient rigid and sufficiently acuate to allow piercing the plant root to produce a stab gash sufficiently deep to traverse a cortex of the plant root and to penetrate to a xylem of the root, upon driving the stab unit into the root; and

[2] a heater in thermal communication with the stab knife, so constructed and energized so as to allow surface temperatures of the stab knife higher than 70 C.

Optionally, the methods can also comprise having an operator use a user pole mechanically affixed to the stab knife, to forceably push the stab knife into the root to produce the stab gash. Surface temperatures of the stab knife or temperatures induced at the site of the invasive gash wound or stab gash can be higher than 70 C, such as 100 C or 200 C.

The hot stab plant eradicator or methods taught can also include use of a heated arresting flat of the stab knife which contacts the root, for greater effectiveness.

Furthermore, a shrouding of the root and the stab knife can also be used to increase the temperature adjacent the invasive gash wound or stab gash K. Preferably, the stab knife is formed to be sufficiently acuate and flat so as to allow a surface/volume ratio for the stab knife to be at least twice that of a cone of similar size and extent.

BRIEF DESCRIPTION OF THE DRAWINGS

FIGS. 3 and 4 show schematic representations of a plant root acted upon by heat, cutting and damage; and natural trauma, respectively;

FIG. 5 shows partial cross sectional, partial surface view of a plant in soil, with a root structure in soil;

FIGS. 6-21 show prior art eradication processes or natural trauma which are not effective for plant control, with FIGS. 6-9 showing pulling to induce tensile failure; FIGS. 10-11 showing a severing action or cut; FIGS. 12-14 showing burn or fire treatment to the plant root and surrounding soil; FIGS. 15-16 showing surface trauma delivered to plant root epidermis and cortex; FIGS. 17-18 showing a hot needle wound; and FIGS. 20-21 showing heat applied to the root crown, using a prior art device whose partial cross section is shown in FIG. 19;

FIG. 22 shows a partial cross-sectional view, partial surface view of a hot stab plant or weed eradicator according to the invention, featuring a user pole and stab unit;

FIG. 23 shows a view similar to that of FIG. 22, but showing internal structure of the stab unit; including a heater and stab knife and shroud;

FIG. 24 shows an oblique view of the hot stab plant eradicator, with the shroud pushed up against spring pressure to expose the stab knife;

FIG. 25 shows a close-up view of the bottom portion of FIG. 24, showing the stab unit;

FIG. 28 shows a prior art conical tip plant eradicator/thermal applicator, in cross section;

FIG. 29 shows an oblique view of a partially schematic stab unit of the hot stab plant eradicator of the present invention;

FIGS. 30 and 31 show a stab unit of the present invention inducing a hot gash stab wound upon a plant root, with the shroud shown pushed upward for clarity of view, and showing the stab unit up close obliquely;

FIGS. 32-34 show schematic cross sections of root structure, with FIG. 33 showing invasive gash wound progress according to the invention, penetrating to the xylem layer, and FIG. 34 showing a hot wound;

FIG. 35 shows a plant in a view similar to FIGS. 6-21, having suffered the hot stab gash wound according to the invention;

FIG. 36 shows a view similar to that of FIGS. 32-34, showing exudates emitted from the damaged root structure;

DEFINITIONS

Figure 1:
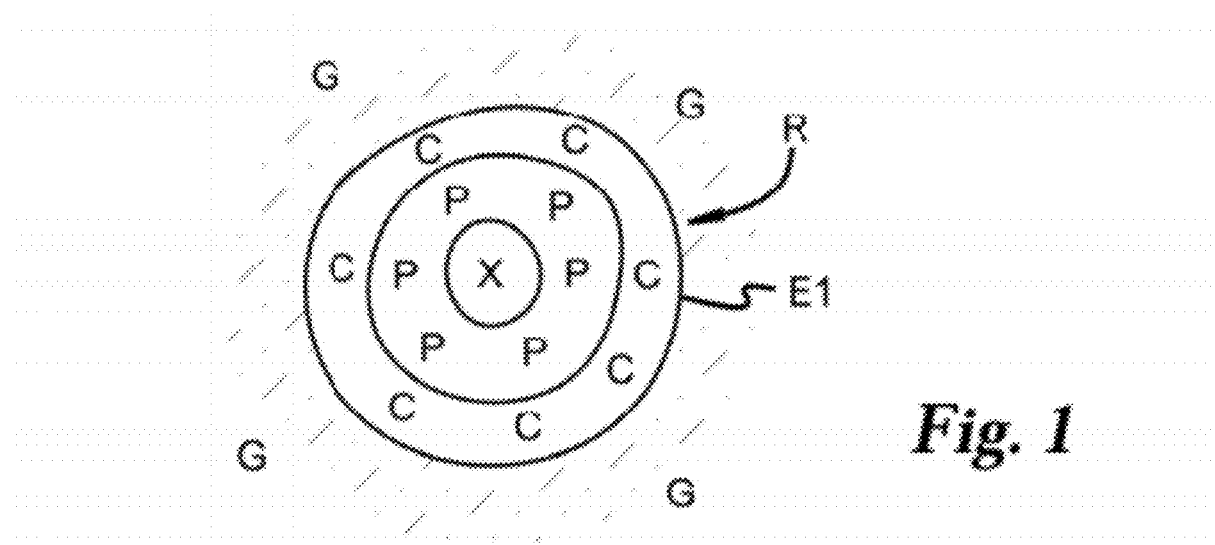
FIG. 1 shows a schematic representation of a plant root cross section, featuring a xylem layer, phloem layer, cortex, epidermis, and surrounding soil.
Figure 2:
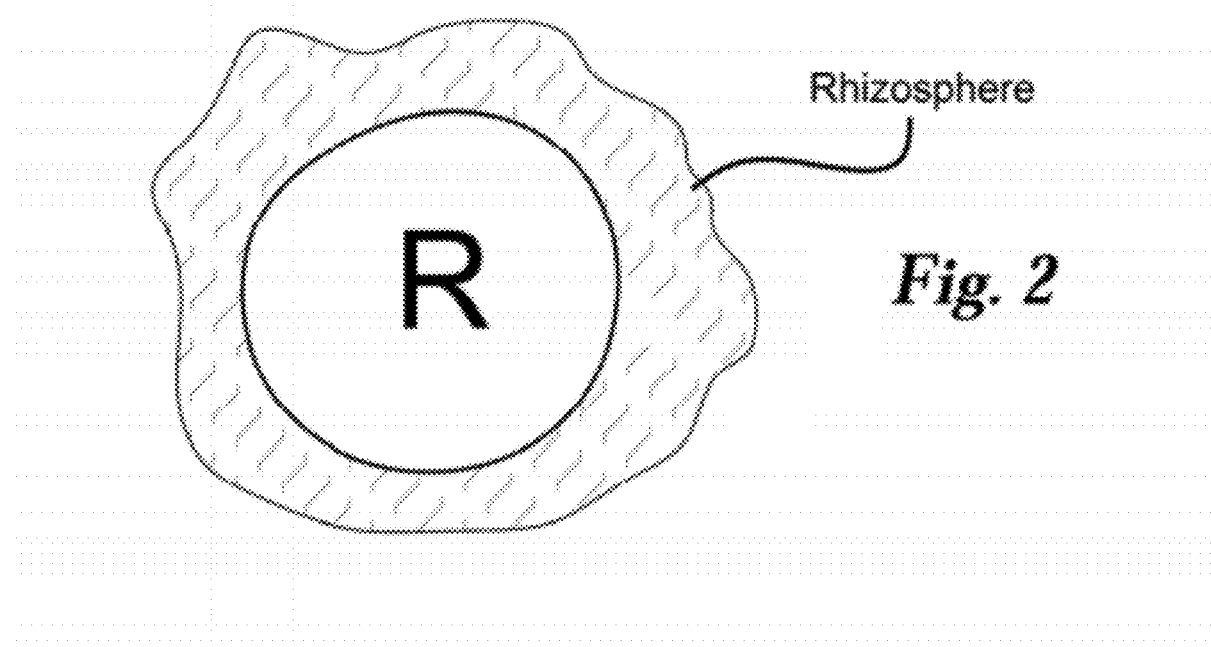
FIG. 2 shows a schematic of a plant root cross section surrounded by rhizospheric soil.
Figure 3:
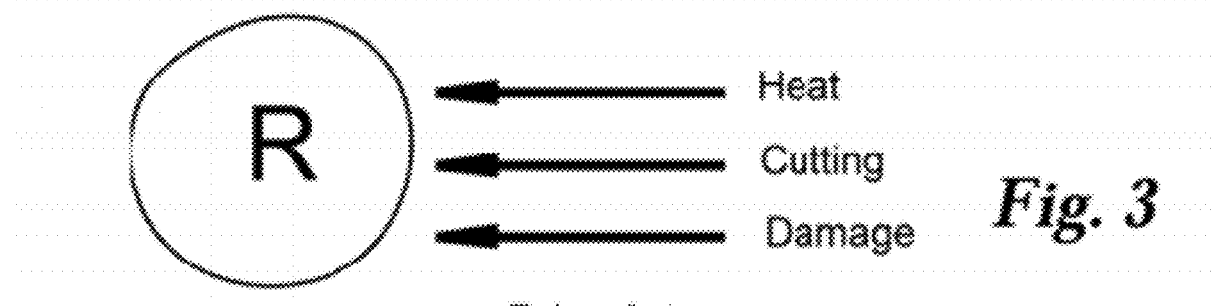
Figures 13, 14:
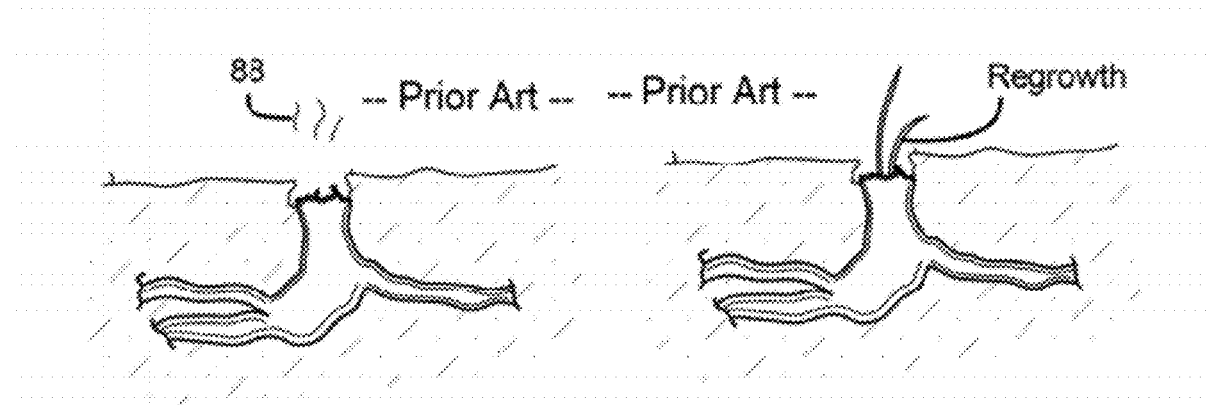
Figures 15, 16:
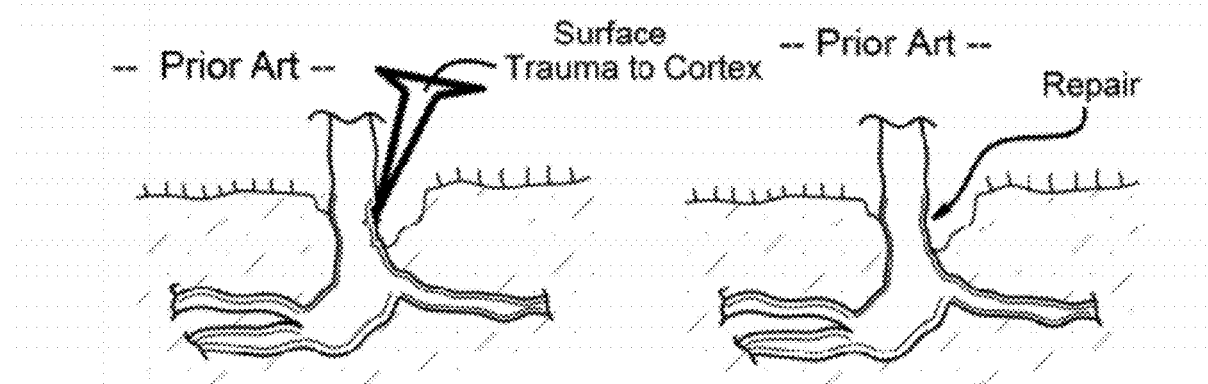
Figures 17, 18:
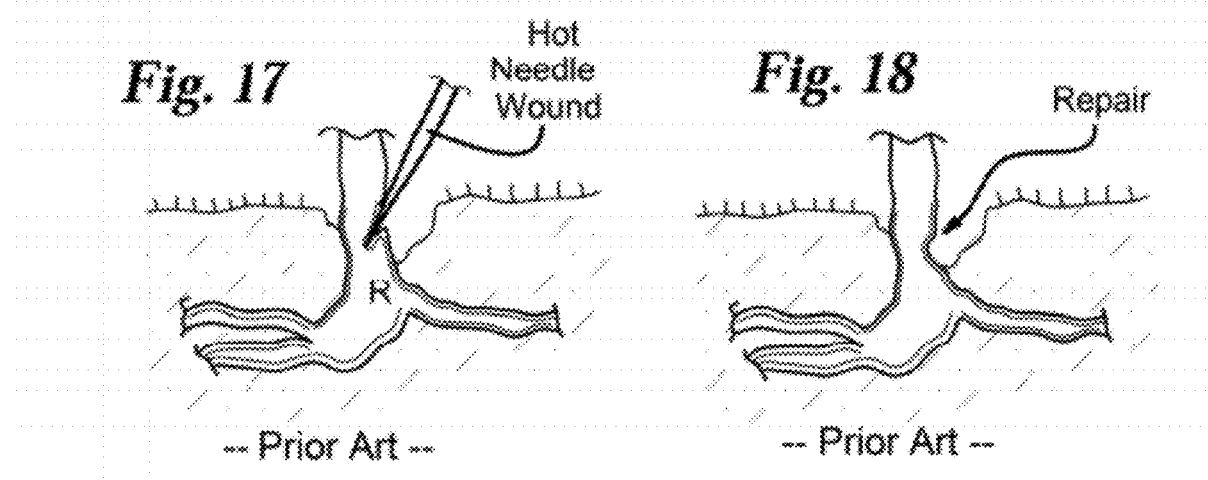

The following definitions shall be used throughout:

Adjacent—shall denote on or adjacent.

Cortex—shall mean any outer portion of the root of a plant.

Exudates—shall include any and all sugars (e.g., glucose) and carbohydrates leached or oozing from a plant root as a direct result of an injury sustained by the instant invention.

Heating—shall include all forms of energy or processes that produce heat, such as use of steam, microwaves, or light, including infra-red light.

Phloem—shall include any living transport tissue that carries organic nutrients such as sugars, and amino acids.

Rhizosphere—shall include all microorganisms in contact with, in the vicinity of, or interacting with a plant root system, such as nitrogen-fixing bacteria, fungi, and mycorrhizae, such as arbuscular mycorrhizae which can inhabit root structure.

Root—can include a taproot, stem or other similar major vascular component of a plant, and can include above-ground components.

Xylem—shall include any water transport tissue that typically operates using root pressure or transpirationally induced forces, and any central vascular tissue that performs similar functions and other functions, such as dispatching healing substances such as plant latex.

DETAILED DESCRIPTION

Now referring to FIG. 22, a partial cross-sectional view, partial surface view of a hot stab plant or weed eradicator according to the invention is shown. The hot stab plant eradicator features a user pole 11 mechanically affixed to a stab unit U. User pole 11 incorporates or attached to a user handle 19, and can also allow entry of an electrical or other line cord 22 as shown. User pole 11 has a spring 99 attached thereto, or incorporated therein, whose function is to maintain a downward bias on a shroud 7 that is part of stab unit U.

FIG. 23 shows a view similar to that of FIG. 22, but showing internal structure of the stab unit U and user pole 11. Inside stab unit U as shown, there is a stab knife V, a flat acuate V-shaped rigid, thermally conductive member, residing inside shroud 7 when shroud 7 is not pushed upward against bias of spring 99. Stab knife V is in thermal communication with heater H as shown. Heater H can be unified with stab knife V as shown, or can be a separate component. Stab knife V, heater H, and shroud 7 are held together as known in the mechanical arts by a mount 15 as shown, allowing that user pole 11 is ultimately mechanically affixed to stab knife V. User pole 11 can be made of a size convenient for use by an operator, such that the total length of the hot stab plant eradicator as shown from the bottom portion of stab knife V to the top of handle 19 is approximately 79 cm (31 inches). A user or operator uses the device by inducing particular mechanical and thermal wound upon a plant root by forcing stab unit U and stab knife V into a root.

The operation of the hot stab plant eradicator as discussed below can be made possible through the use of a circuit board/controller 188, which can take energy from optional battery packs (not shown) or from line cord 22, to provide electrical or other input to heater H via heater leads 122 as shown. Operation of the device can be facilitated by actuation switch 10, which can communicate or be interfaced with circuit board/controller 188 to provide trigger-type operation. Circuit board/controller 188 can provide optional additional functions, such as indicating suggested time of use for various weeds in response to set period recorded on circuit board/controller 188 or in response to actual feedback obtained from current draw fed to heater H. Results or other operation details can be provided on a display D8, located at the top of handle 19 as shown.

Shroud 7 defines a shroud volume 100 as shown, which allows for concentration of heat about stab knife V during use. As shown below, use of the hot stab plant eradicator usually results in shroud 7 being pushed upward against spring 99 as needed.

FIG. 24 shows an oblique view of the same hot stab plant eradicator, and with the shroud 7 pushed up against spring pressure from spring 99 to expose the stab knife V.

Figure 41:
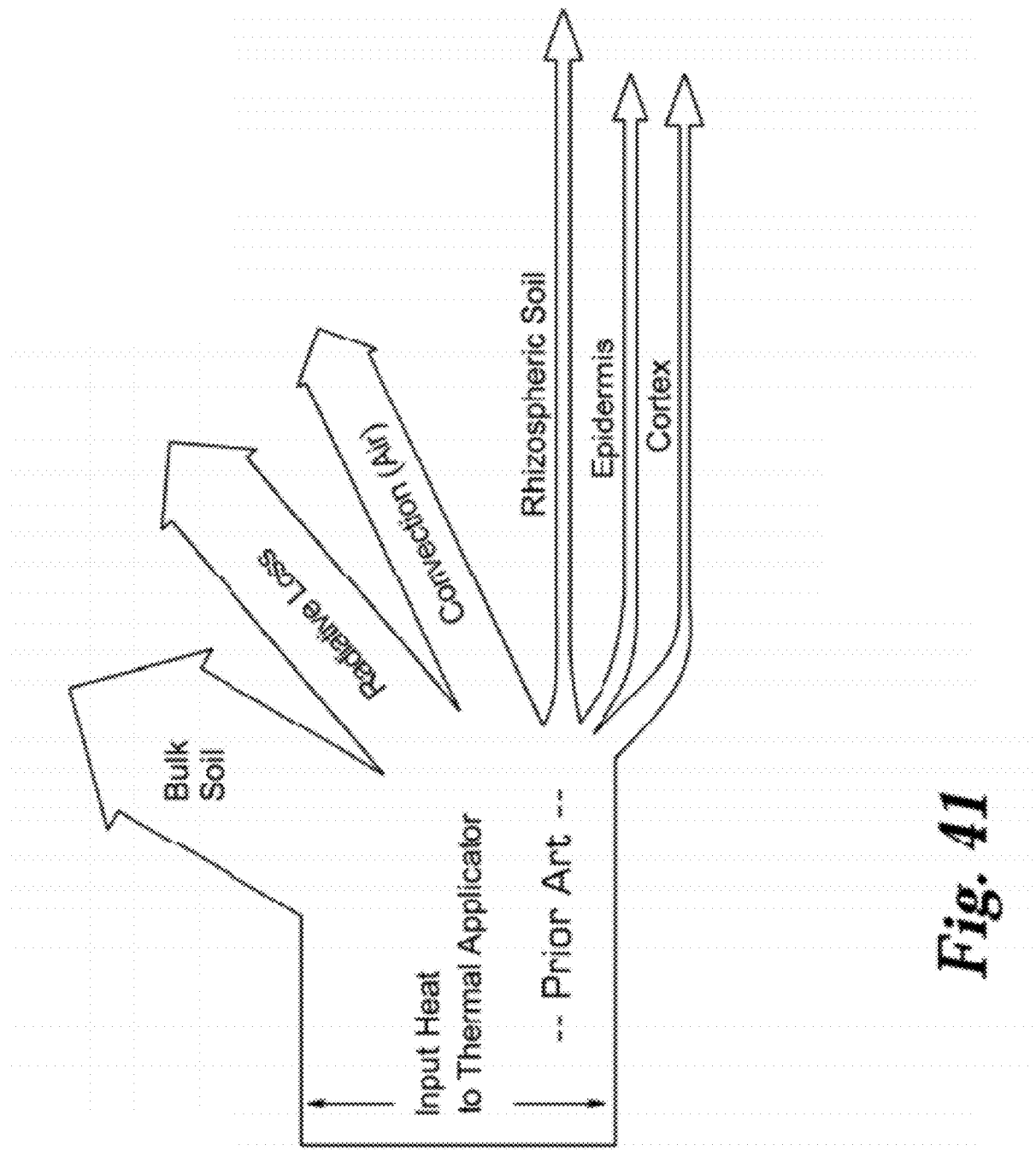
FIG. 41 shows a schematic representation of heat input and losses for a prior art thermal applicator, with heat losses shown.

FIG. 25 shows a close-up view of the bottom portion of FIG. 24, showing the stab unit U. Once shroud 7 is fully pushed upward against spring pressure, the exposed portion of stab knife V is about 5 cm (2 inches) in length. This short exposure of the stab knife V helps keep thermal losses to a minimum for faster and more effective operation (see FIGS. 41 and 42).

Figures 26, 27:
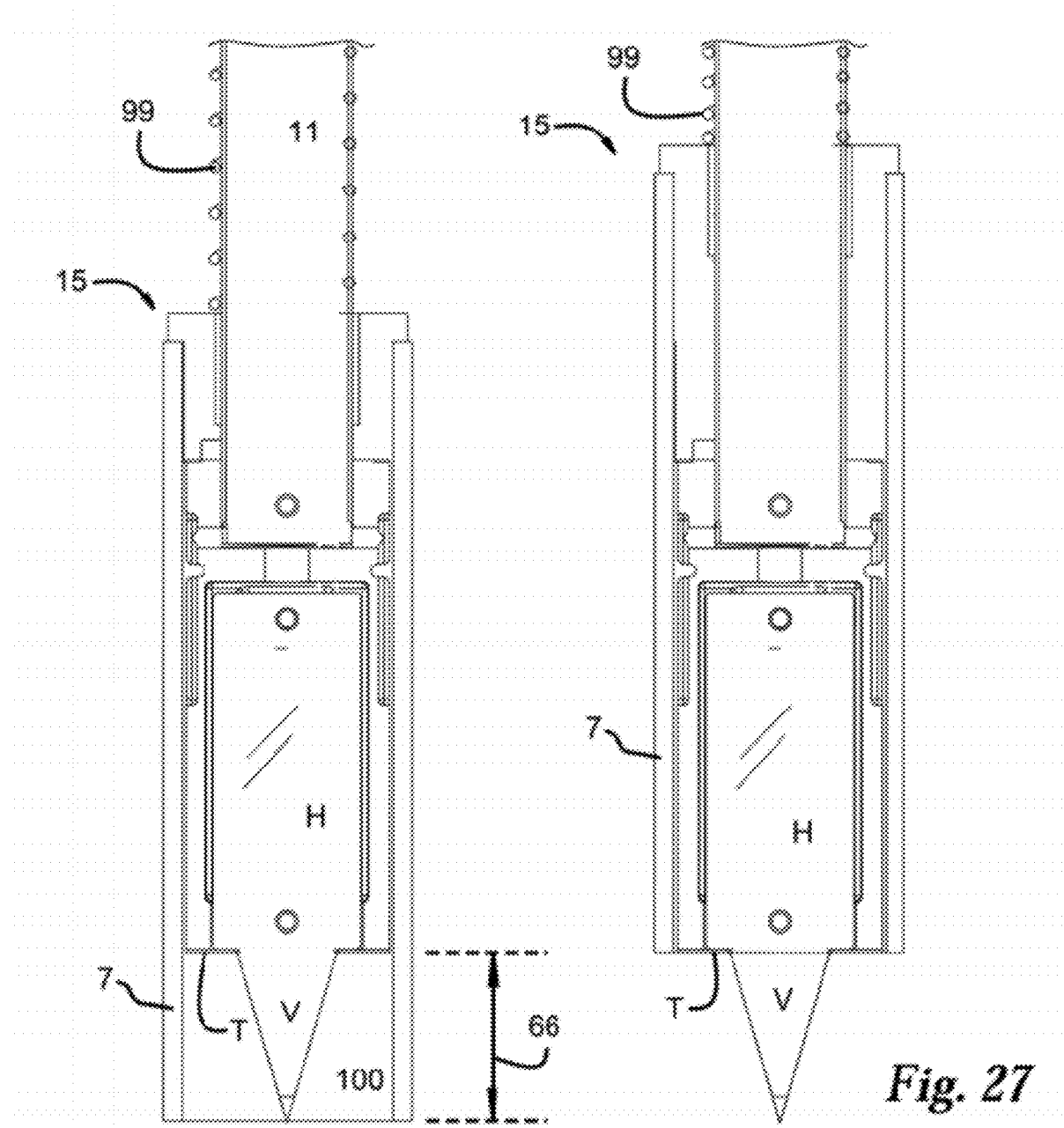
FIGS. 26 and 27 show a close-up view of the stab unit of the hot stab plant eradicator of FIGS. 22-23, and with the shroud relaxed and pushed up against spring pressure, respectively.

Close-up views of the stab unit U are shown in FIGS. 26 and 27. Shroud 7 is relaxed in FIG. 26, providing a full shroud volume 100 as shown. Pushing up on shroud 7, as might happen when stab unit U and stab knife V are pushed into a plant root, results in displacement of shroud 7 by a field of stab or range 66 as shown, allowing full exposure of stab knife V. Shroud 7 still thermally insulates heater H to some degree as shown, reducing parasitic thermal losses.

A very helpful feature as shown is arresting flat T at the broad end of stab knife V as shown. Arresting flat T can be part of stab knife V, or otherwise in thermal communication with heater H. When using the hot stab plant eradicator, arresting flat T can contact root R, usually when stab knife V is fully stabbed therein. Arresting flat T helps induce cellular damage in the vicinity or adjacent to a stab wound that will be generated by stab knife V as discussed below.

Heater H can be provided by use of commonly available positive temperature co-efficient (PTC) heating elements, such as a contact type heater HPG 5/24 100X44 available from DBK USA Inc, Cincinnati, Ohio, USA, with a maximum power of 250 watts. PTC heaters are small ceramic stones with self temperature limiting characteristics. They have fast heating response times and plateau once a predefined reference temperature is reached. The shape of these PTC heater stones can be designed to be square, rectangular, round, ring or doughnut style. Above the reference temperature, the semiconducting and ferro-electrical properties of the ceramic are utilized to produce a rise in resistance of several orders of magnitude, and produce self limiting thermal characteristics. The length of the heater H as shown is approximately 100 mm (4 inches).

FIG. 28 shows a prior art conical tip plant eradicator/thermal applicator in cross section, with conical tip 4 as shown. Although pointed and could be described as sharp, the surface to volume ratio afforded by this conical tip 4 is not suitable for inflicting the trauma taught here, namely, the oblique view of a partially schematic stab unit of the hot stab plant eradicator of the present invention given in FIG. 29. Stab unit U is shown, featuring arresting flat T and stab knife V as shown. It has been discovered that stab knife V should be flat for effectiveness, with stab knife V having a surface to volume ratio of at least twice that of a prior art conical tip 4 as shown in FIG. 28 of like width and extent.

Figure 38:
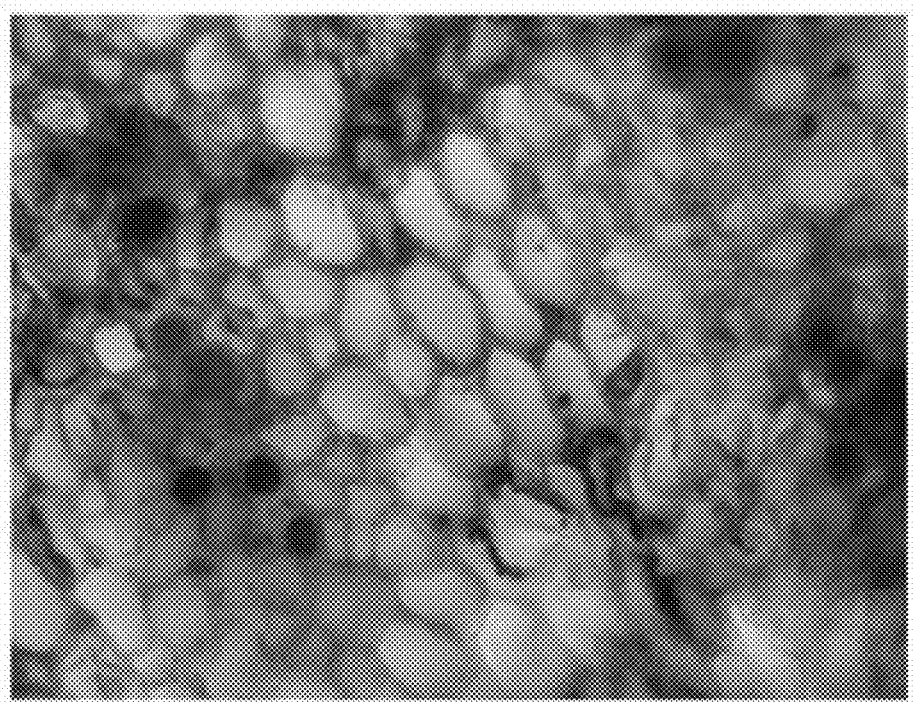
FIG. 38 shows a cross-sectional grey-tone photograph of dandelion root tissue cells having suffered heat or thermogenic damage according to the invention.

Stab unit U is used to inflict a hot stab gash wound as shown in FIGS. 30-36. FIGS. 30 and 31 show a stab unit of the present invention inducing a hot gash stab wound upon a plant root, with the shroud 7 shown pushed upward for clarity of view, and showing the stab unit U up close obliquely. In FIG. 30, stab knife V is shown contacting root R. Having an operator or machine press stab unit U and stab knife V into root R results in a stab gash K as shown in FIG. 31. The flat, acuate, and V-shaped stab knife V produces a deep wound which uses compressive pressure induced by the V-shape to increase contact pressures and induce fast thermal transfer from heater H and stab knife V into root R. Thermal transfer causes root cells in the vicinity of stab gash K to be damaged by heat as shown in FIG. 38 below.

Figure 32:
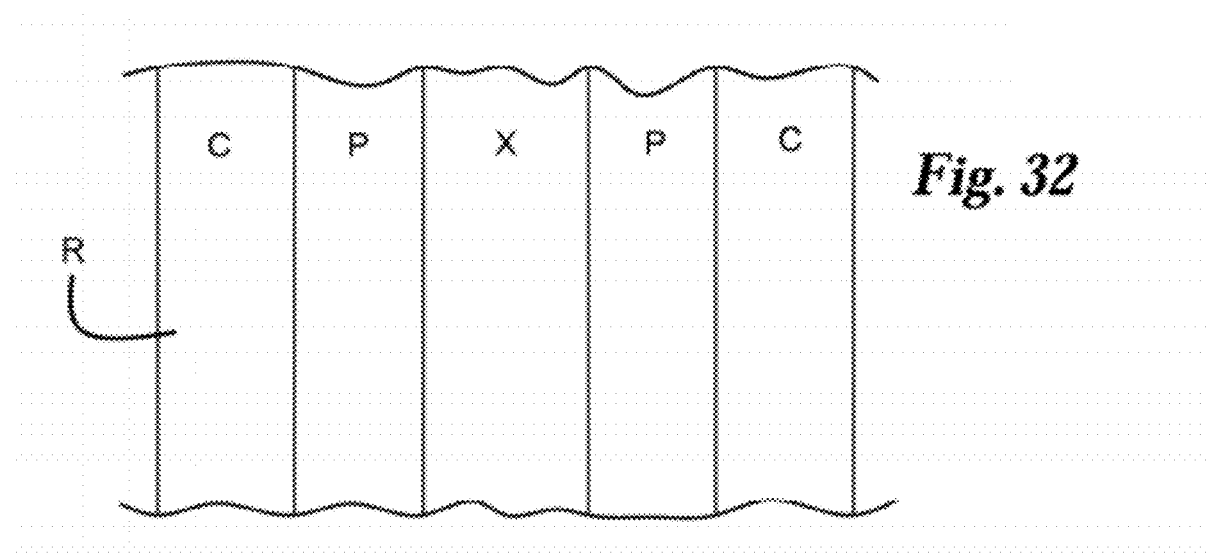
Figure 33:
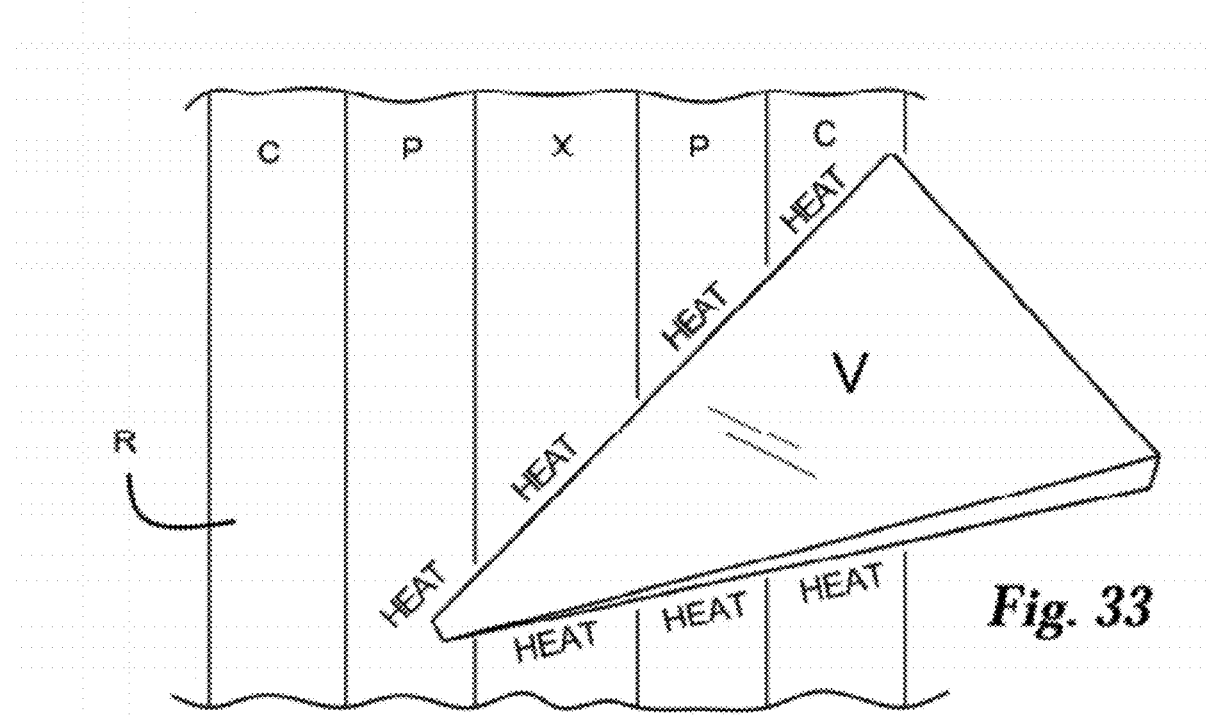

FIG. 32 shows a schematic cross sections of the structure of root R, with xylem layer X, phloem layer P and cortex C as shown. The hot stab gash wound caused by stab knife V is shown in FIG. 33, where the wound traverses the epidermis (not shown), cortex C, phloem layer P and penetrates to xylem layer X, and possibly further, as shown, where penetration goes more than halfway through the root cross section to phloem layer P on the other side. FIG. 34 shows an open wound, giving the structure of root R after suffering the injury shown in FIG. 33, where with a dwell of stab knife V sufficient to cause cellular damage (typically 3-10 seconds with heater H energized), cellular damage has occurred and there are possible combustion byproducts, volatilized proteins or smoke 88 emanating from the hot stab gash wound as shown. The stab shown is merely illustrative and can be somewhat in an axial direction along root R. Perpendicular or somewhat perpendicular entry wounds as shown in FIG. 33 are not necessary, as long as the cortex C is traversed and the stab knife V penetrates to xylem layer X.

FIG. 35 shows the stab gash K in root R just after removal of the hot stab plant eradicator, with combustion byproducts, volatilized proteins or smoke 88 rising from the root. The flat, rigid stab knife V is most effective when used such that surface temperatures are at least 70 C, preferably above 100 C, and ideally at or slightly above 200 C for fast efficient operation. Heater H allows that these surface temperatures are maintained even when inducing the stab gash K as shown. The lower the surface or equivalent temperatures, the longer the dwell time of the stab knife V is needed. Higher temperatures than 200 C increasingly become a safety concern, and are believed to be less effective due to wholesale cauterization of root R.

The result of this injury is unexpected, with plant exudates leaking out sugars and other energy rich substances from root R and stab gash K, allowing feeding of fungi in the rhizosphere associated with the plant Y. FIG. 36 shows exudates E emitted from the damaged root structure. It is believed that the success of this method resides in stimulating fungi that feed upon these exudates, in conjunction with changes in the rhizosphere populations and healing coming from the xylem layer X being compromised, resulting in disruption of healing of stab gash K.

Figure 37:
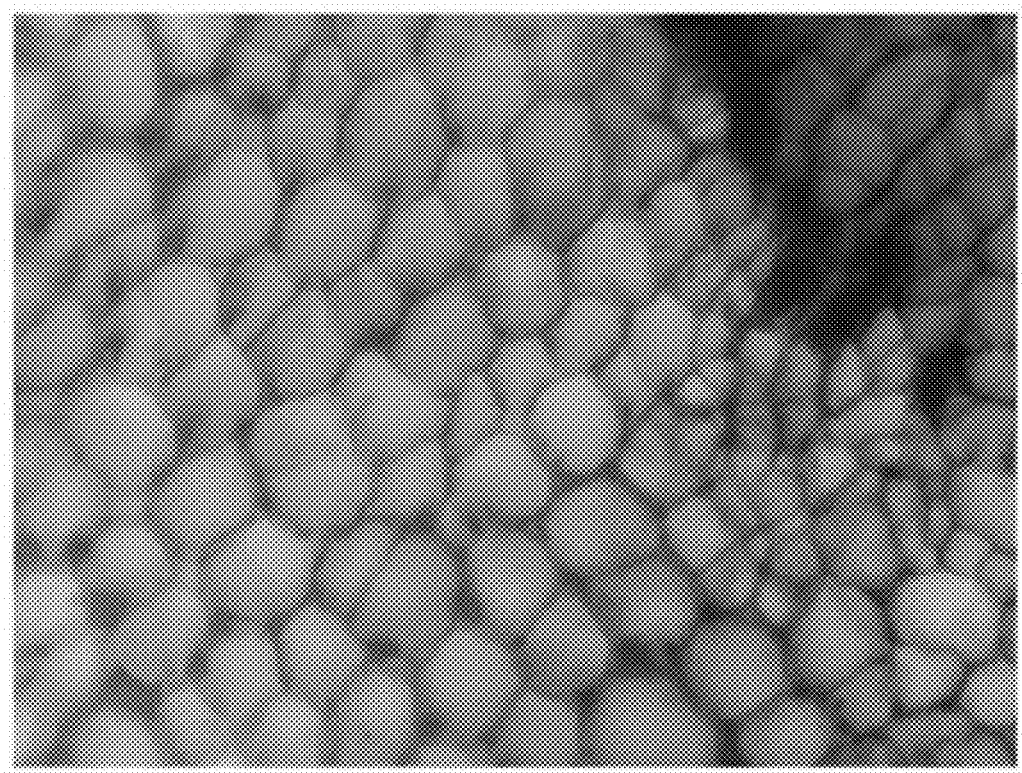
FIG. 37 shows a cross-sectional grey-tone photograph of healthy dandelion root tissue cells.

FIG. 37 shows a cross-sectional grey-tone photograph of healthy dandelion root tissue cells. This healthy tissue features fat rounded cells as shown. After use of the invention, and allowing stab knife V to dwell for sufficient time to cause cellular damage in the vicinity of stab gash K, damaged cells as shown in a similar photograph of FIG. 38 are produced. These dandelion root tissue cells have suffered heat or thermogenic damage according to the invention. These thermogenically damaged tissue cells show voids, and shrunken cells, with some cells having lost shape and definition.

Generally heating the root crown alone as taught in the prior art is not successful overall, whereas the injury as obtained via the method and device given here results in high success rates for weed and plant control.

Figure 39:
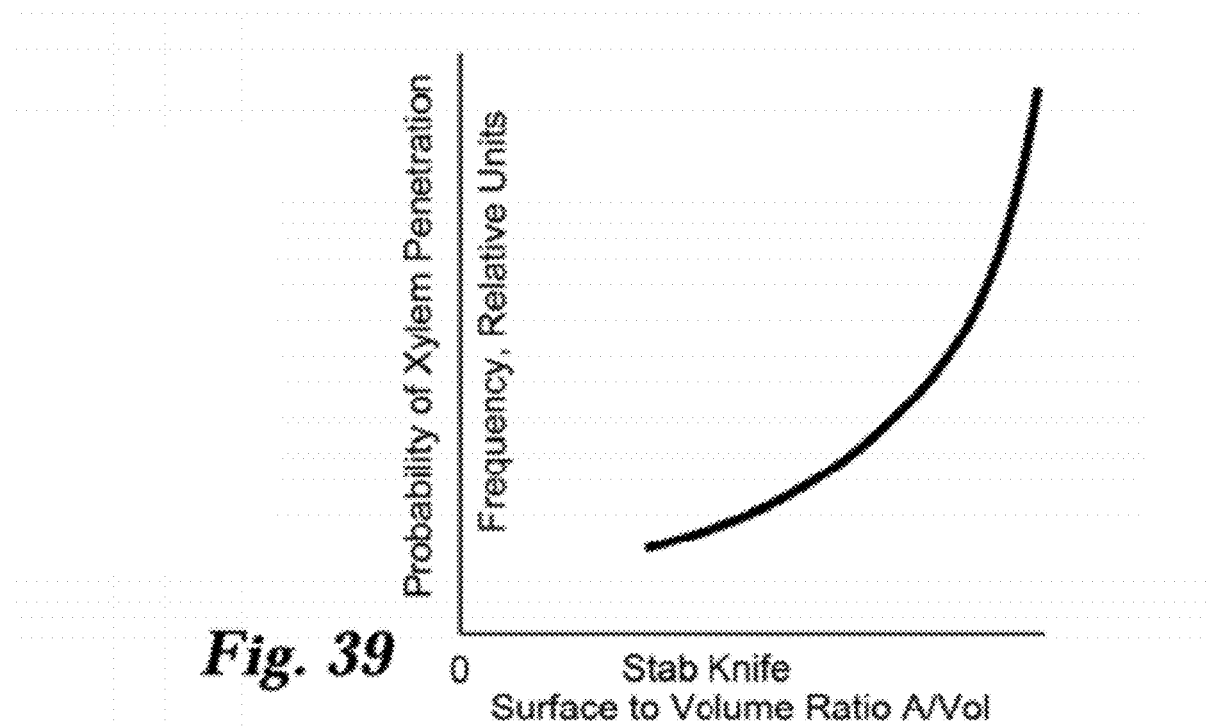
FIG. 39 shows a cartesian plot of the probability of xylem penetration as a function of stab knife surface to volume ratio, in relative units.

The geometry of stab knife V is important. With a high surface/volume ratio flat form factor, stab knife V was discovered to be particularly effective for weed control, and also for inducing the very hot stab gash wound that has been found to be effective. FIG. 39 shows a cartesian plot of the probability of xylem penetration as a function of stab knife surface to volume ratio, in relative units. As mentioned, conical shapes, such as conical tip 4 of FIG. 19 tend to avoid creating a stab gash K upon forceful contact with a root R.

Figure 40:
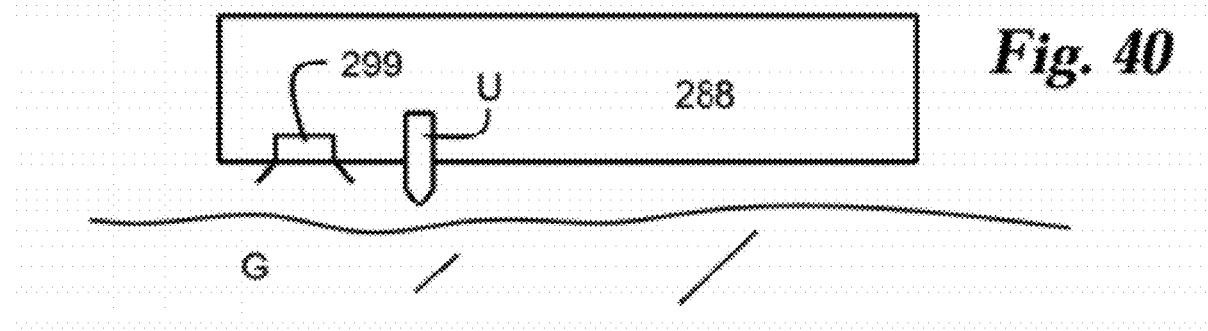
FIG. 40 shows a scanning-capable device in schematic representation, capable of using the present invention by identifying undesirable plants and inducing mechanical and thermal damage according to the invention.

FIG. 40 shows schematically a scanning-capable device capable of using the present invention by identifying undesirable plants and inducing mechanical and thermal damage according to the invention. Scanning eradicator 288 as shown has an known image processing or pattern recognition camera and processor 299 as shown, which works in conjunction with a stab unit U made to use the same operating principles as given above. Scanning eradicator 288 can scan earth or soil G, identify undesirable plants, and kill them using the technique given here.

The geometry and arrangement of stab knife V inside stab unit U, with optional shroud 7 allows for a minimum of thermal losses. As shown in the schematic representation of FIG. 41, for a prior art thermal applicator, Input Heat to Thermal Applicator as indicated is largely lost to Bulk Soil, and to Radiative Loss and Convection (Air) loss as shown, in addition to loss to Rhizospheric Soil, with relatively little energy for application to only the Epidermis and Cortex as shown. This is due to the large structures given in the prior art, where heated wands, spades, and the like allow that thermal energy is lost and applied with reduced effectiveness. This is in contrast with a similar representation for the hot stab plant eradicator according to the invention as shown in FIG. 42.

Figure 42:
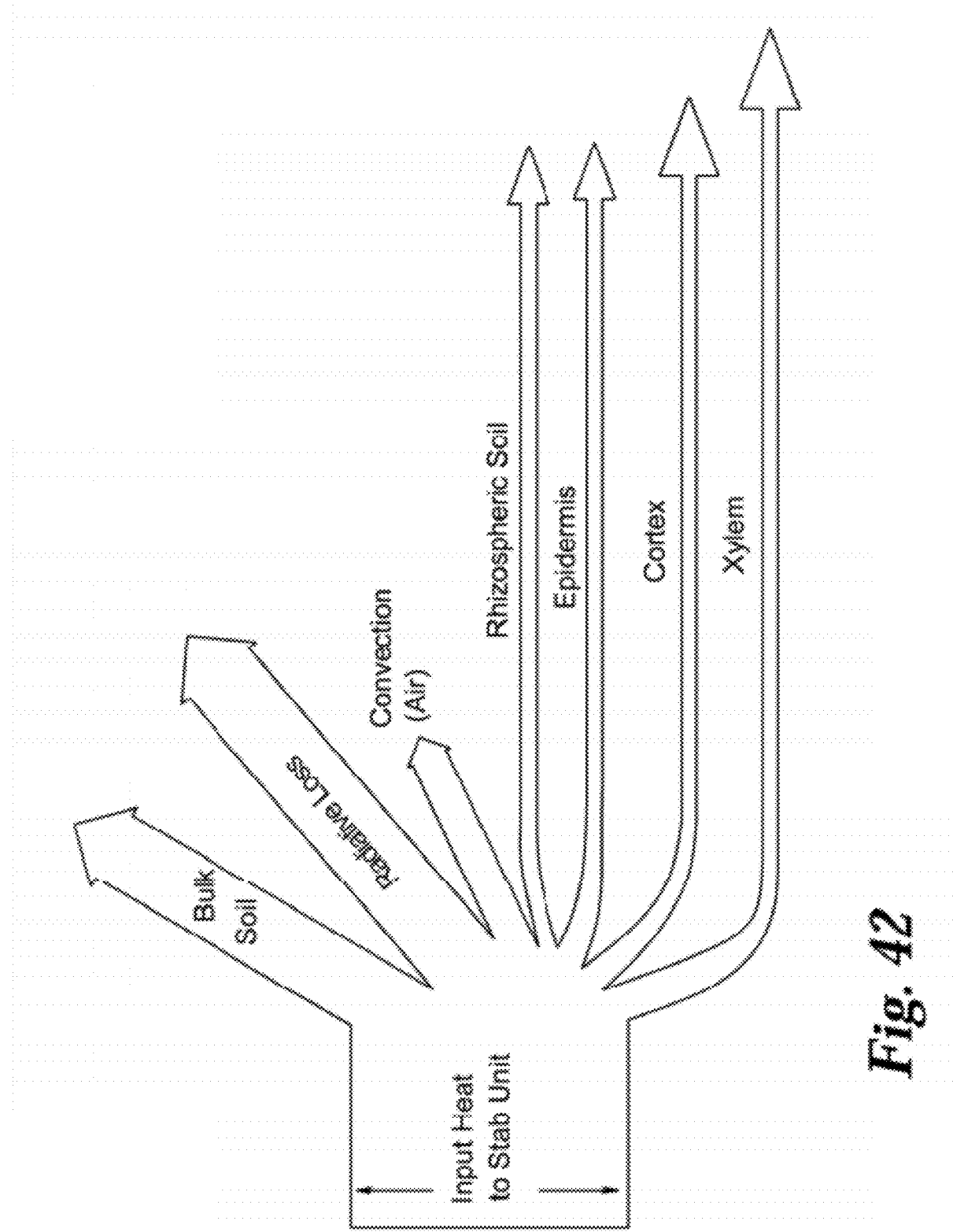
FIG. 42 shows a schematic representation of heat input and losses for a the hot stab plant eradicator according to the invention, with heat losses shown.

In FIG. 42, heat losses to Bulk Soil, and to Radiative Loss and Convection (Air) are reduced as shown. A greater proportion of input thermal energy generated by heater H is supplied to Epidermis and Cortex as shown, and notably is also delivered in good measure to xylem layer X, a key difference with the prior art.

Figure 43:
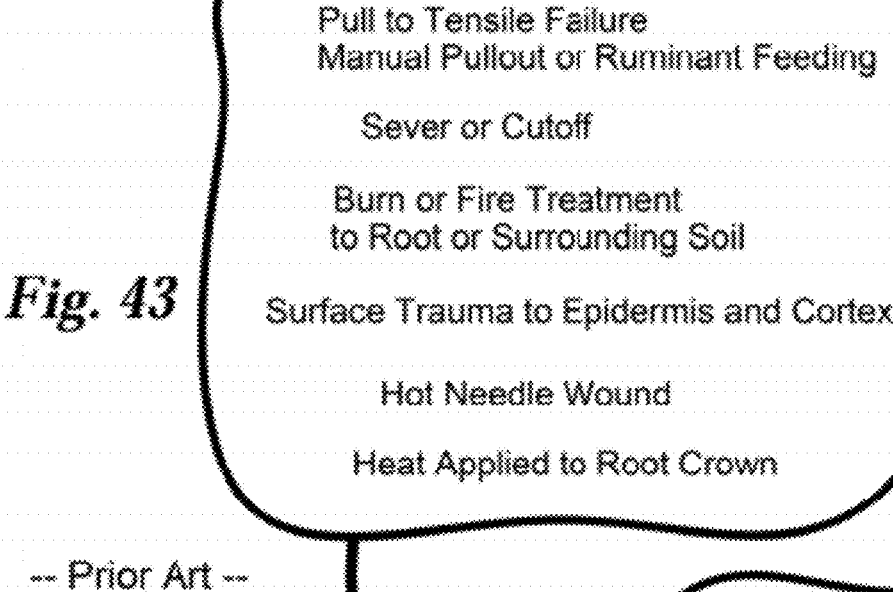
FIG. 43 shows a text summary of the series of ineffective methods for plant eradication cited in FIGS. 6-21, which tend to allow plant regrowth or repair.

FIG. 43 shows a text summary of the series of ineffective methods for plant eradication cited in FIGS. 6-21, which tend to allow plant regrowth or repair, namely as shown, Pull to Tensile Failure or Manual Pullout or Ruminant Feeding; Sever or Cutoff; Burn or Fire Treatment to Root or Surrounding Soil; Surface Trauma to Epidermis and Cortex; Hot Needle Wound; and Heat Applied to Root Crown.

Figure 44:
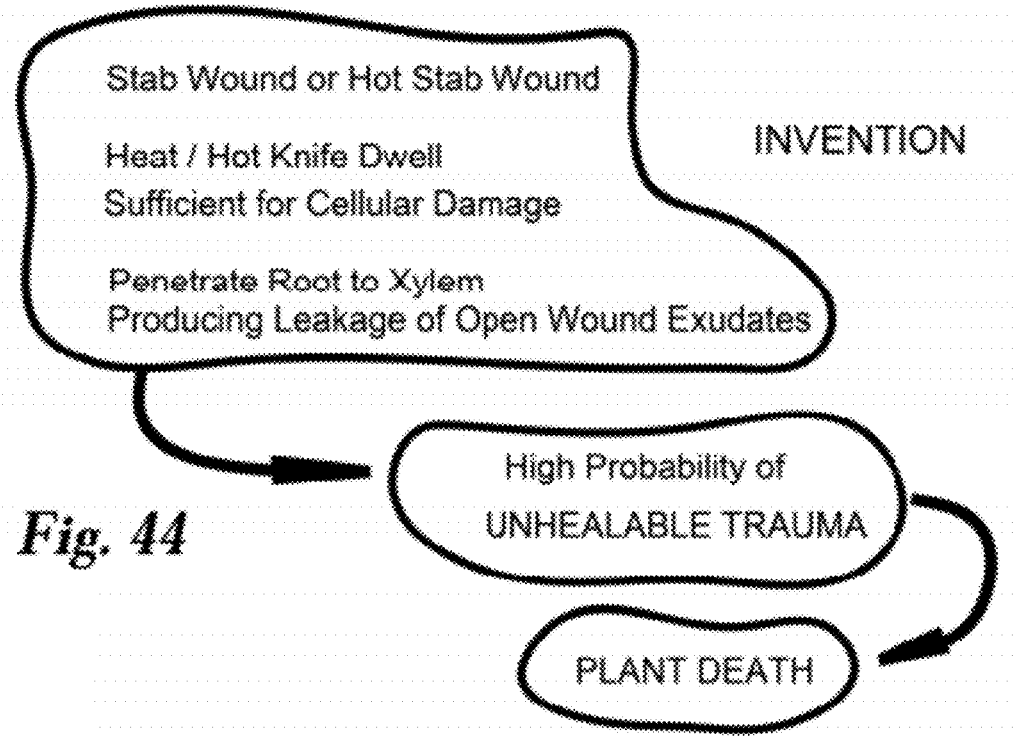
FIG. 44 shows a text summary of at least one method for plant eradication according to the invention which produces a high probability of inducing unhealable trauma and plant death.

This is in contrast to the methods of the present invention, shown in FIG. 44, where, as shown, a Stab Wound or Hot Stab Wound is delivered to the root R in the manner described above, penetrating to xylem layer X. The application of heat from stab knife V is not strictly necessary, because it is possible to heat the root cells in the vicinity of stab gash K with steam or by other known means of imparting thermal energy, shown as Heat/Hot Knife Dwell Sufficient for Cellular Damage. Finally, with the step given of Penetrate Root to Xylem Producing Leakage of Open Wound Exudates one obtains a High Probability of Unhealable Trauma and Plant Death as shown. Those in the art will see that the stab gash K can be inflicted in ways other than specifically shown here, such as an invasive gash wound produced by a machine using elements that might differ from those shown. For example, stab knife V can be replaced by multiple knives or by a process (e.g., laser burning) that produces the same result.

Figure 45:
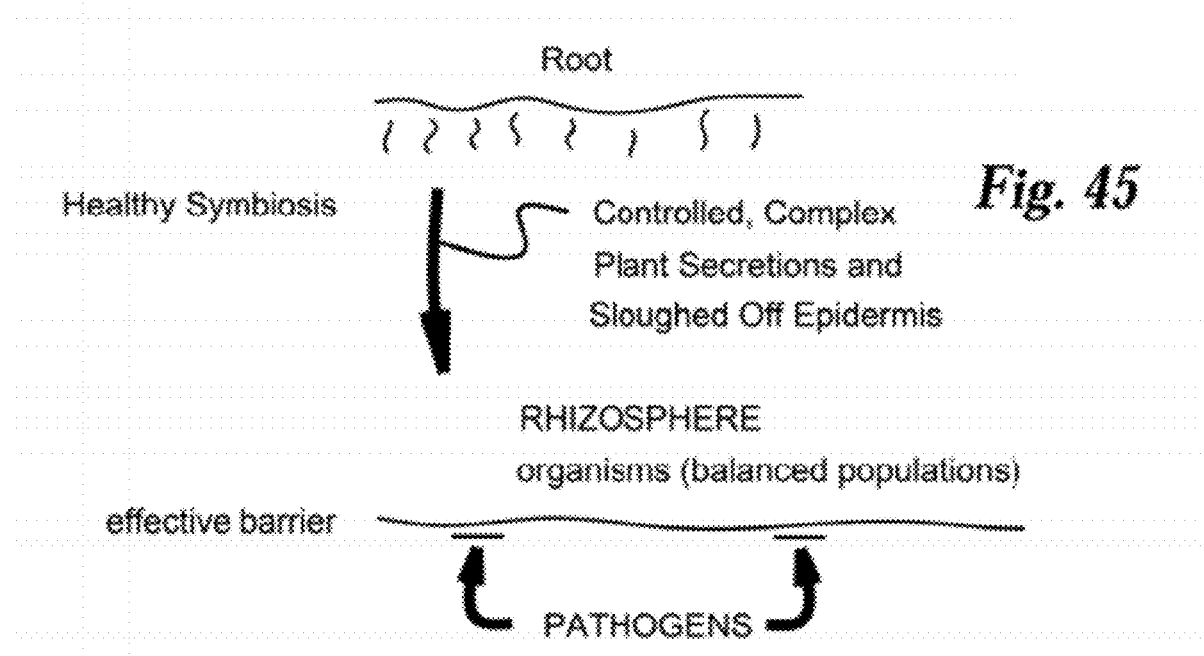
FIG. 45 shows a schematic representation of a healthy rhizospheric symbiosis with a plant root, warding off pathogens.

The success of this technique is perhaps explainable by actions of the rhizosphere. FIG. 45 shows a schematic representation of a healthy rhizospheric symbiosis with a plant root, warding off pathogens. In a healthy root prior to application of the present invention, Healthy Symbiosis is typically maintained, where Controlled, Complex Plant Secretions and Sloughed Off Epidermis are emitted by the Root as shown. This provides the Rhizosphere organisms as shown to have balanced populations of microbiological entities, providing an effective barrier to PATHOGENS as shown.

Figure 46:
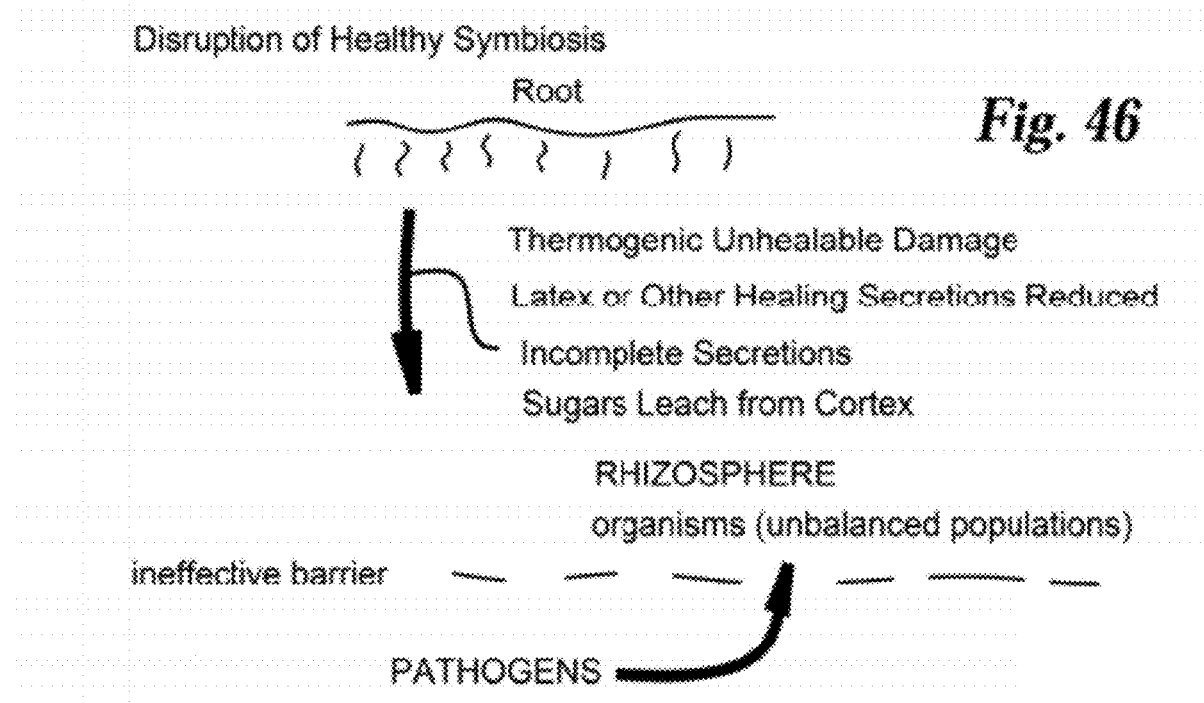
FIG. 46 shows a schematic representation of the disruption of a healthy rhizospheric symbiosis with a plant root, after thermogenic unhealable damage obtained according to the invention, and failing to ward off pathogens from root tissue.

FIG. 46 shows a similar schematic representation of the disruption of a healthy rhizospheric symbiosis with a plant root, after thermogenic unhealable damage is achieved using the hot stab plant eradicator or methods according to the invention. Disruption of Healthy Symbiosis occurs as Thermogenic Unhealable Damage occurs, Latex or Other Healing Substances (are) Reduced, Incomplete Secretions are emitted by the root, including healing substances, and Sugars Leach from Cortex, from the hot stab gash wound as taught. This produces unbalanced populations in the rhizosphere as shown, resulting in an ineffective barrier to PATHOGENS as shown.

It is believed that initial stimulation of fungi by the leaching of sugars (from exudates E) is followed by rotting or consuming of the plant root by the same fungi.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the features mentioned above. Also, nothing as taught and claimed here shall preclude addition of other structures or functional elements.

Obviously, many modifications and variations of the present invention are possible in light of the above teaching. It is therefore to be understood that, within the scope of the appended claims, the invention may be practiced otherwise than as specifically described or suggested here.

I claim:

1. A method to trigger an interruption of a healthy symbiosis of a plant root (R) with rhizosphere microorganisms surrounding said root, said method comprising:
    [1] Inflicting a stab gash (K) using a flat stab knife (V) so formed as to be at least one of acuate and v-shaped, said stab gash sufficiently deep to traverse a cortex (C) of said plant root and penetrate to a xylem (X) of said root at a location;
    [2] heating said root via dwell of said stab knife in said root at said location, with said stab knife heated by thermal communication with a heater (H) and held at a temperature of higher than 70 C for sufficient time to cause a cellular damage to said plant root, including said xylem at said location.

2. The method of claim 1, additionally comprising having an operator use a user pole mechanically affixed to said stab knife, to push forceably said stab knife into said root to produce said stab gash.

3. The method of claim wherein said temperature higher than 70 C is higher than 100 C.

4. The method of claim 1, wherein said temperature higher than 70 C is higher than 200 C.

5. The method of claim 1, additionally comprising:
    [3] Contacting a heated arresting flat (T) of said stab knife with said root.

6. The method of claim 1, additionally comprising:
    [4] Shrouding said root and said stab knife to increase said temperature adjacent said location.

7. A method to trigger an interruption of a healthy symbiosis of a plant root (R) with rhizosphere microorganisms surrounding said root, said method comprising:
    [1] Inflicting a stab gash (K) using a flat stab knife (V) so formed as to be at least one of acuate and v-shaped, said stab gash sufficiently deep to traverse a cortex (C) of said plant root and penetrate to a xylem (X) of said root at a location;
    [2] heating said root at said location to a temperature of higher than 70 C for sufficient time to cause a cellular damage to said plant root, including said xylem at said location.

8. The method of claim 7, additionally comprising having an operator use a user pole mechanically affixed to said stab knife, to push forceably said stab knife into said root to produce said stab gash.

9. The method of claim 7, wherein said temperature higher than 70 C is higher than 100 C.

10. The method of claim 7, wherein said temperature higher than 70 C is higher than 200 C.

11. The method of claim 7, additionally comprising:
    [3] Contacting a heated arresting flat (T) of said stab knife with said root.

12. The method of claim 7, additionally comprising:
    [4] Shrouding said root and said stab knife to increase said temperature adjacent said location.

* * * * *